United States Patent [19]
Fletcher

[11] 4,445,174
[45] Apr. 24, 1984

[54] MULTIPROCESSING SYSTEM INCLUDING A SHARED CACHE

[75] Inventor: Robert P. Fletcher, Poughkeepsie, N.Y.

[73] Assignee: International Business Machines Corporation, Armonk, N.Y.

[21] Appl. No.: 249,526

[22] Filed: Mar. 31, 1981

[51] Int. Cl.³ ............................................... G06F 13/00
[52] U.S. Cl. ...................................... 364/200; 364/134
[58] Field of Search ... 364/200 MS File, 900 MS File, 364/134

[56] References Cited

U.S. PATENT DOCUMENTS

| | | | |
|---|---|---|---|
| 3,566,358 | 2/1971 | Hasbrouck | 364/200 |
| 3,581,291 | 5/1971 | Iwamoto et al. | 364/200 |
| 3,723,976 | 3/1973 | Alvarez et al. | 364/200 |
| 3,735,360 | 5/1973 | Anderson et al. | 364/200 |
| 3,771,137 | 11/1973 | Barner et al. | 364/200 |
| 3,845,474 | 10/1974 | Lange et al. | 364/200 |
| 3,848,234 | 12/1974 | MacDonald | 364/200 |
| 4,056,844 | 11/1977 | Izumi | 364/200 |
| 4,075,686 | 2/1978 | Calle et al. | 364/200 |
| 4,078,254 | 3/1978 | Beausoleil et al. | 364/900 |
| 4,096,567 | 6/1978 | Millard et al. | 364/200 |
| 4,161,024 | 7/1979 | Joyce et al. | 364/200 |
| 4,181,935 | 1/1980 | Feeser et al. | 364/200 |
| 4,181,937 | 1/1980 | Hattori et al. | 364/200 |
| 4,195,342 | 3/1980 | Joyce et al. | 364/200 |
| 4,228,503 | 10/1980 | Waite et al. | 364/200 |
| 4,313,161 | 1/1982 | Hardin et al. | 364/200 |
| 4,322,795 | 3/1982 | Lange et al. | 364/200 |
| 4,345,309 | 8/1982 | Arulpragasam et al. | 364/200 |
| 4,395,753 | 7/1983 | Comfort et al. | 364/200 |
| 4,410,944 | 10/1983 | Kronies | 364/200 |

OTHER PUBLICATIONS

IBM Tech. Discl. Bull., vol. 15, No. 11, Apr. 1973; "Attached Support Processor w/Shared Cache and Execution Unit", by M. S. Schmookler, pp. 3463-3464.
IBM Tech. Discl. Bull., vol. 21, No. 6, Nov. 1978; "Data Processing System with Second Level Cache", pp. 2468-2469; by F. J. Sparacio.

*Primary Examiner*—Jerry Smith
*Assistant Examiner*—William G. Niessen
*Attorney, Agent, or Firm*—Jack M. Arnold

[57] ABSTRACT

A control system for interlocking processors in a multiprocessing organization. Each processor has its own high speed store in buffer (SIB) cache and each processor shares a common cache with the other processors. The control system insures that all processors access the most up-to-date copy of memory information with a minimal performance impact. The design allows read only copies of the same shared memory block (line) to exist simultaneously in all private caches. Lines that are both shared and changed are stored in the common shared cache, which each processor can directly fetch from and store into. The shared cache system dynamically detects and moves lines, which are both shared and changed, to the common shared cache and moves lines from the shared cache once sharing has ceased.

15 Claims, 18 Drawing Figures

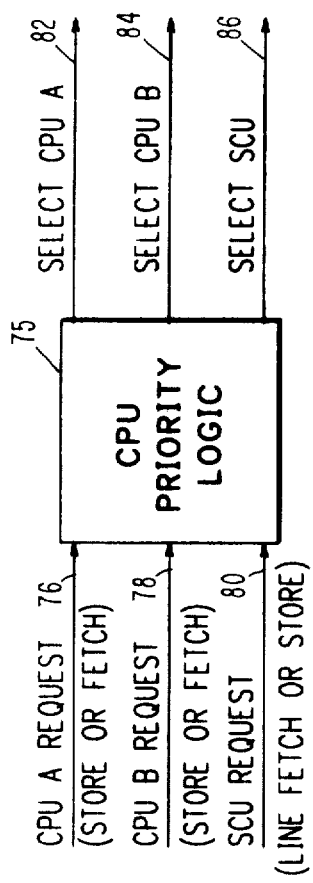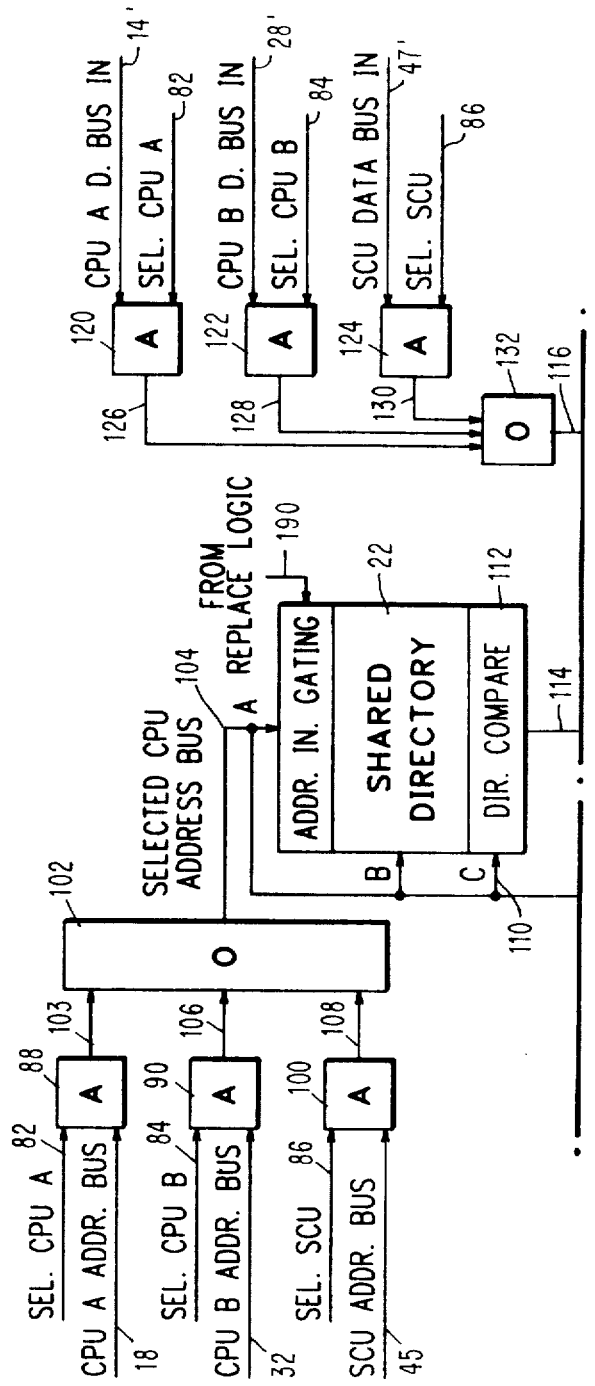
FIG. 4.1

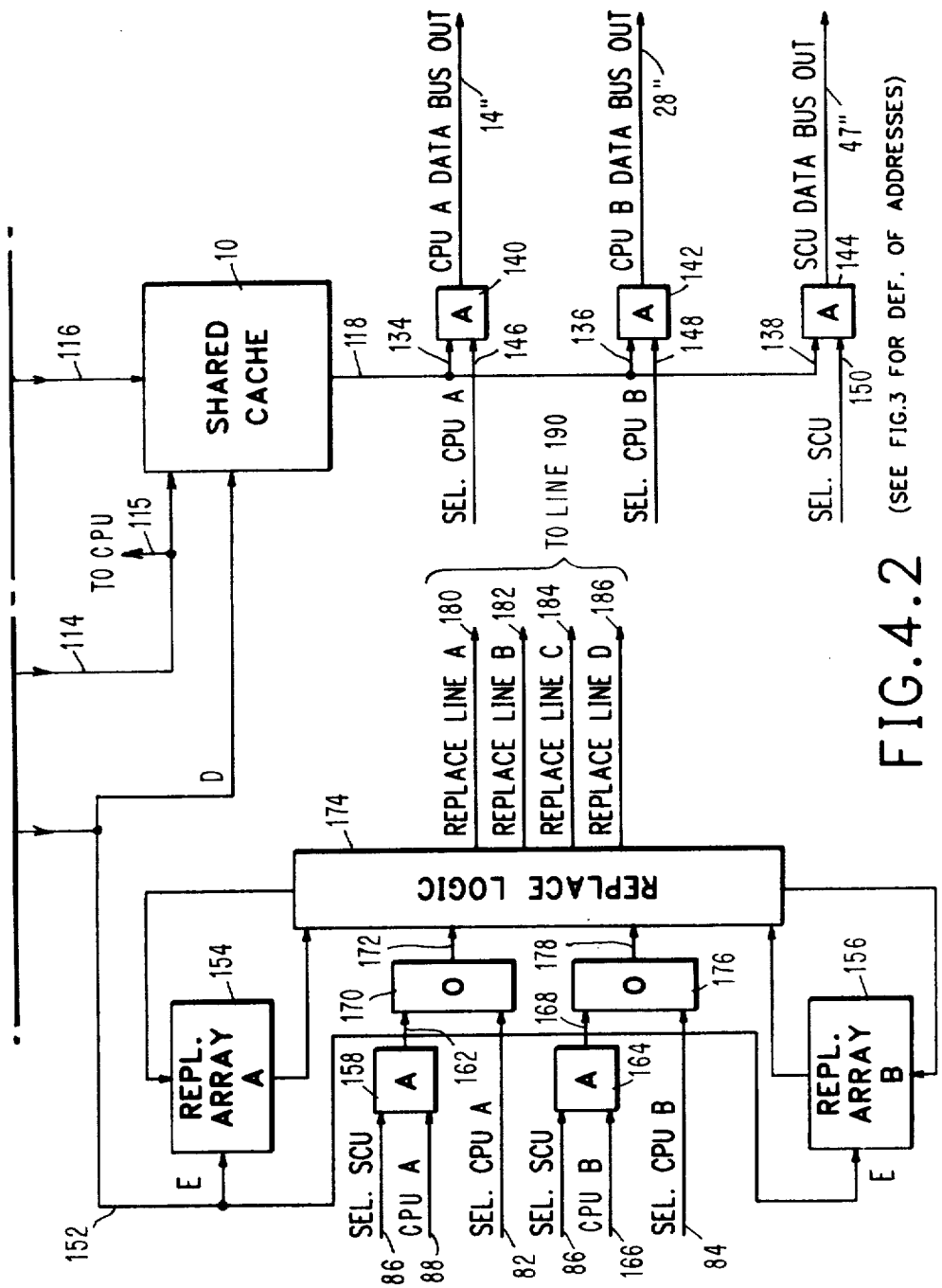
FIG. 4.2 (SEE FIG. 3 FOR DEF. OF ADDRESSES)

(SCU DATA FLOW SCHEMATIC)

FIG. 9 (SCU XI CONTROL SCHEMATIC)

(SCU XI CONTROL SCHEMATIC)

(SCU XI CONTROL SCHEMATIC)

(SCU XI CONTROL SCHEMATIC)

| TYPE MISS | REQUESTING CPU A | | CH. BIT | REQUESTING CPU B |
|---|---|---|---|---|
| | (ACTION ON A XI HIT) | | | (ACTION ON A XI HIT) |
| FETCH MISS | FETCH LINE FROM MEMORY TO A CACHE & MARK LINE RO FETCH WORD FROM A CACHE | | 0 | MARK LINE RO IN B CACHE |
| | FETCH WORD FROM S CACHE | | 1 | TRANSFER LINE FROM S CACHE TO MEMORY TRANSFER LINE FROM B CACHE TO S CACHE & INVALIDATE LINE IN B CACHE |
| STORE MISS | FETCH LINE FROM MEMORY TO S CACHE STORE WORD IN S CACHE | | 0 | TRANSFER LINE FROM S CACHE TO MEMORY & INVALIDATE LINE IN B CACHE |
| | STORE WORD IN S CACHE | | 1 | TRANSFER LINE FROM S CACHE TO MEMORY TRANSFER LINE FROM B CACHE TO S CACHE & INVALIDATE LINE IN B CACHE |

CH. BIT = CHANGE FLAG BIT
S CACHE = SHARED CACHE
A CACHE = PRIVATE CACHE OF CPU A
B CACHE = PRIVATE CACHE OF CPU B
RO = READ ONLY

FIG. 13

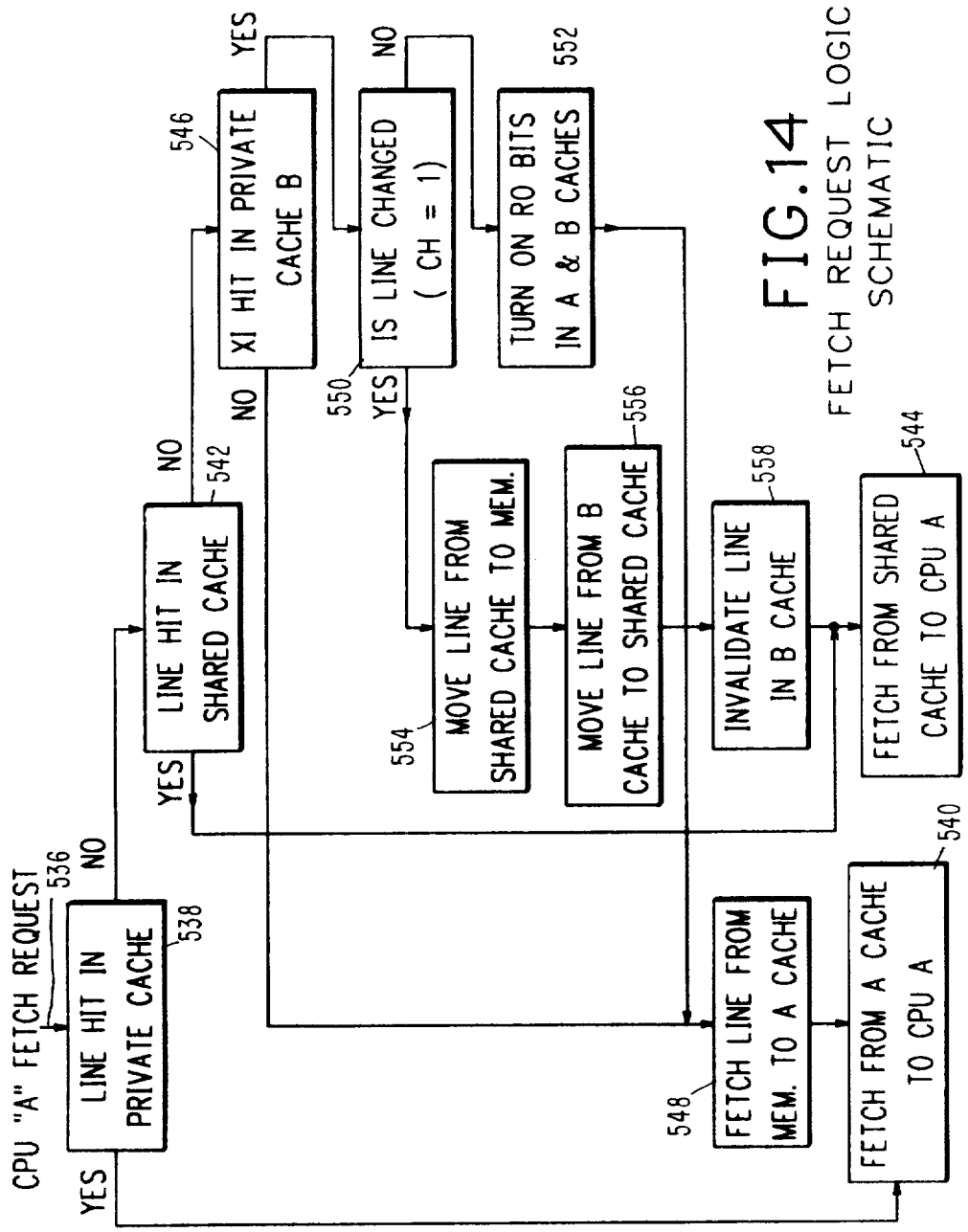
FIG.14 FETCH REQUEST LOGIC SCHEMATIC

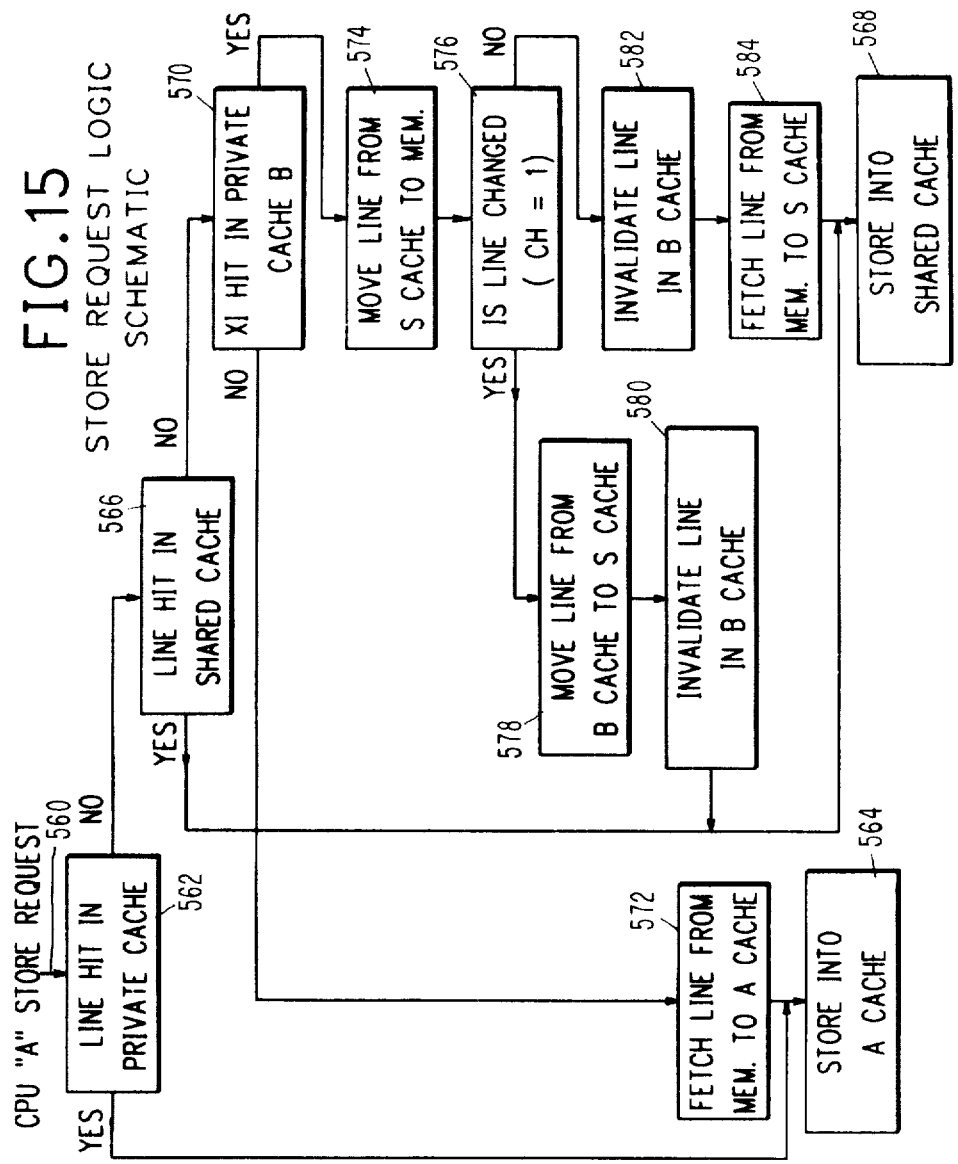

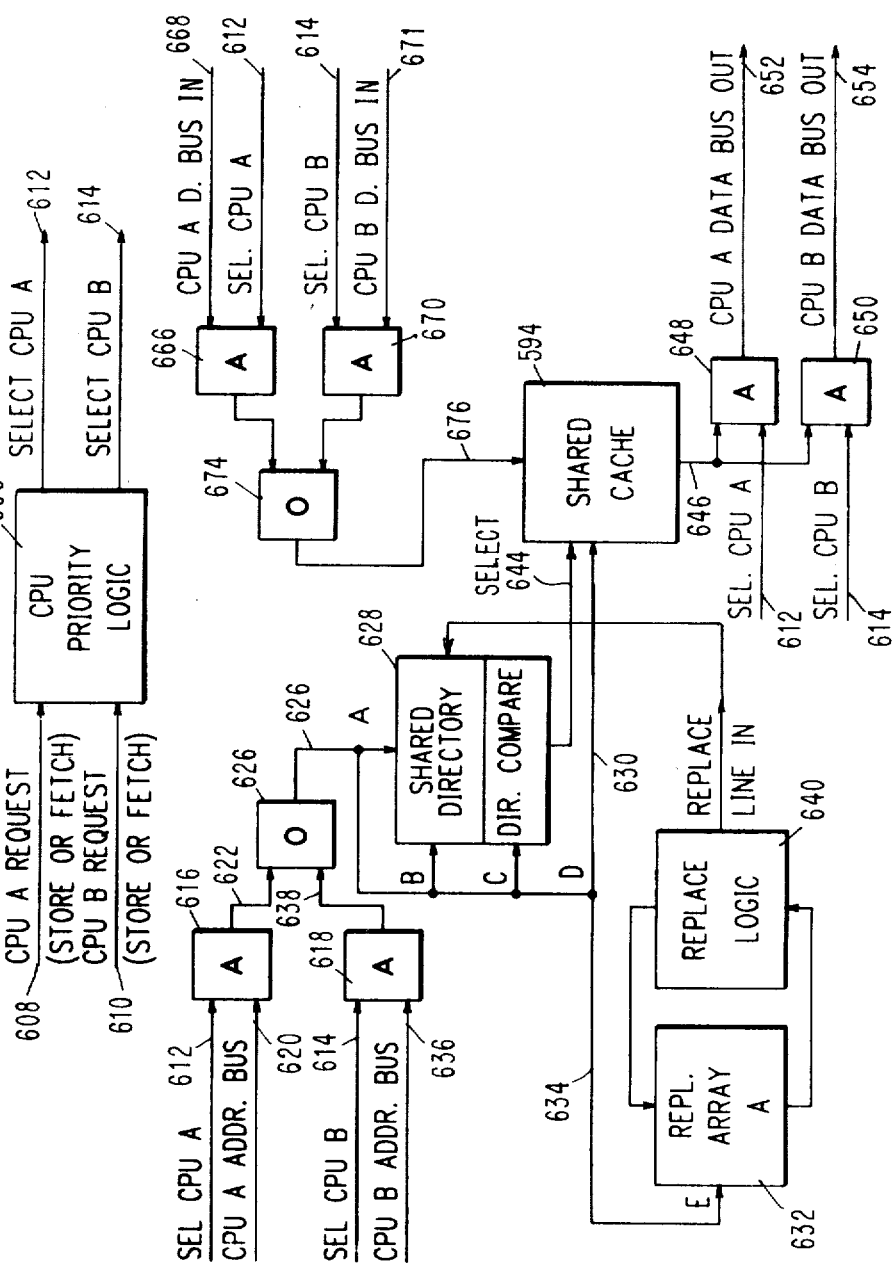
FIG. 17 (SEE FIG. 3 FOR DEF. OF ADDRESSES)

MULTIPROCESSING SYSTEM INCLUDING A SHARED CACHE

DESCRIPTION

1. Technical Field

The invention is in the field of data processing, and specifically is directed to multiprocessing organizations where each processor has a private cache, and each processor shares a common cache and a common main memory with the other processors.

2. Background Art

Most high performance processors have a private high speed hardware managed buffer memory in front of the main memory to improve average memory access time to the processor (CPU). This high speed buffer is sometimes termed a "cache" because it is usually transparent to a programmer.

In shared memory multiprocessing configurations there is the problem of each processor obtaining the most recent copy of main memory information because each cache is private to a given CPU. Sometimes this is solved by performing "stores" through to the main memory thus maintaining it current for all processors. This "store thru" (ST) cache is the type currently implemented in most large CPU's. The disadvantage of a ST cache is that all stores, which usually average between ten and twenty percent of all references, are sent to main memory, requiring substantial main memory bandwidth to avoid significant performance degradation. Consequently, the level of multiprocessing (MP), that is, the number of processors sharing the main memory is generally very limited with the ST cache unless a relatively high performance main memory is used.

In designs where there is insufficient main memory bandwidth to make "store thru" a viable solution, a store in buffer (SIB) cache is often implemented. SIB caches are described in U.S. Pat. Nos. 3,735,360 and 3,771,137 which are assigned to the assignee of the present invention.

A ST cache handles stores differently from fetches, that is, a store miss cannot occur because all stores go to main memory independent of the addressed line (target line) being in the cache. Conversely, a SIB cache treats stores and fetches the same; the line must be in the cache before performing the store or fetch. If the target line is not in the cache (cache miss) the line is transferred from main memory to the cache before performing the fetch or store. Because all subsequent stores to a line take place in the cache, the SIB cache substantially reduces the main memory bandwidth needed by the CPU compared to a ST cache design.

A problem with a SIB cache in a multiprocessing system is that the main memory is not kept current, the current information is often in the caches. Consequently, to insure that each processor receives current memory information, when a processor generates a fetch or store request to its private cache and the target line is not in the cache (line-miss), all CPU caches must be interrogated to determine if the line is present in the other caches (remote caches) and whether the line has been changed, that is, stored into. If the line is not in a remote cache, the line is fetched from main memory to the requesting processor's cache. If the line is in a remote cache but not changed, the line is invalidated in the remote cache, valid flag set to zero, and the line is transferred from main memory to the requesting processor's cache. If the line is in a remote cache and also changed, the line must first be transferred out of the cache to main memory before invalidating the line in the remote cache. After the line is transferred to main memory the requesting CPU then fetches the line to its cache and then performs the store or fetch.

This movement of a changed line that takes place on a cross interrogate hit entails substantial overhead because the remote processor must send a line to main memory (or directly to the other remote cache in some systems) and then the requesting processor must set the line into its private cache. Thus, two processors encounter interference and lost time. Even worse, many times the remote processor wants the line shortly after giving it up and the line ping-pongs between processors.

There are several multiprocessing systems known in the art, each having certain advantages and disadvantages. U.S. Pat. No. 3,581,291 to Iwamoto et al discloses a multiprocessor system in which each processor has a private cache and both processors share a main memory. The main memory is provided with a key memory which stores an indicator which indicates whether or not information in the main memory is read out and stored in each processor at each predetermined amount of its capacity.

IBM Technical Disclosure Bulletin, Vol. 22, No. 2, July 1979, at pages 851-852, sets forth a partitioned memory and split SCE for an asymmetric multiprocessor, wherein each processor has a separate private cache.

IBM Technical Disclosure Bulletin, Vol. 18, No. 8, January 1976, at pages 2609-2610, sets forth a "Two-Loop Design in a Two Level Storage Hierarchy", in which one storage loop operates off the system clock and the other storage loop operates independent of the system clock.

IBM Technical Disclosure Bulletin, Vol. 16, No. 6, November 1973, page 1847, Boehner et al and IBM Technical Disclosure Bulletin, Vol. 21, No. 3, August 1978, page 998 to Perkins et al, each set forth multiprocessor systems, each processor of which has a private cache but which have no shared memory other than the main memory.

Other art in the general area of multiprocessing which is of general interest include U.S. Pat. No. 3,848,324 to McDonald; U.S. Pat. No. 3,735,360 to Anderson et al; and U.S. Pat. No. 3,845,474 to Lang et al.

According to the present invention a multiprocessing system is set forth including private store in buffer caches, and a common shared cache and a common main memory, which system has improved performance characteristics relative to those presently known in the art. These improved performance characteristics include:

(a) lines of information that are both shared and changed by the private caches are automatically detected by the hardware and moved to the shared cache, thereby eliminating the pingponging of lines between requesting processors that occur in state of the art store in buffer caches, (b) these lines can be moved directly from a private cache to the shared cache without going to main memory, (c) the shared cache has a least recently used (LRU) replacement array per processor, which allows a line in the shared cache to be moved to a private cache once sharing ceases by one of the processors, (d) the shared cache provides additional cache capacity and bandwidth which improves the processor performance. In some implementations, there may be additional access time from the shared cache, but this is minimal because the shared cache capacity is much less than the private cache capacity. This permits close packaging to the processor and also limits the number of references to the shared cache because of the small number of lines in the shared cache compared to the private cache.

SUMMARY OF THE INVENTION

A multiprocessing system which includes at least two processors is set forth. Each processor has a private store in buffer cache, and each processor shares a common cache and a main memory with the other processors. The communication system between processors insures that each processor accesses the most up-to-date copy of memory information with a minimal performance impact. Read-only copies of the same shared memory block may exist simultaneously in each private cache. Lines that are both shared and changed by the two processors are stored in the common shared cache, which each processor can directly fetch from and store into. The shared cache system dynamically detects and moves lines, which are both shared and changed, to the common shared cache and moves lines from the shared cache once sharing has ceased. The dynamic detection, and subsequent movement to the shared cache of lines that are both shared and changed, substantially reduces the performance penalty for sharing, compared to known store in buffer multiprocessing cache systems.

INDUSTRIAL APPLICABILITY

It is an object of the invention to provide an improved multiprocessing system.

It is another object of the invention to provide an improved multiprocessing system wherein each processor has a private cache, and each processor shares a common cache and a common main memory with the other processors.

It is yet another object of the invention to provide an improved multiprocessing system wherein each processor has a private cache, and each processor shares a common cache and a common main memory with the other processors, with line of information that are both shared and changed by the processors being stored in the common shared cache.

BRIEF DESCRIPTION OF THE DRAWINGS

FIGS. 4.1 and 4.2, when viewed with FIG. 4.1 on the top and FIG. 4.2 on the bottom, comprise a block diagram representation of the shared cache directory and replacement array/logic per processor, which is shown generally in FIG. 1;

FIG. 13 is a tabular list of the actions taken by a requesting and remote processor on a cross-interrogation hit;

FIG. 14 is a flow chart of the logic decision/sequences for a processor fetch request;

FIG. 15 is a flow chart of the logic decision/sequences for a processor store request;

FIG. 17 is a block diagram representation of the typical four-way set associative shared cache, directory and LRU replacement array/logic which is shown generally in FIG. 16.

BEST MODE OF CARRYING OUT THE INVENTION

Figure 1:
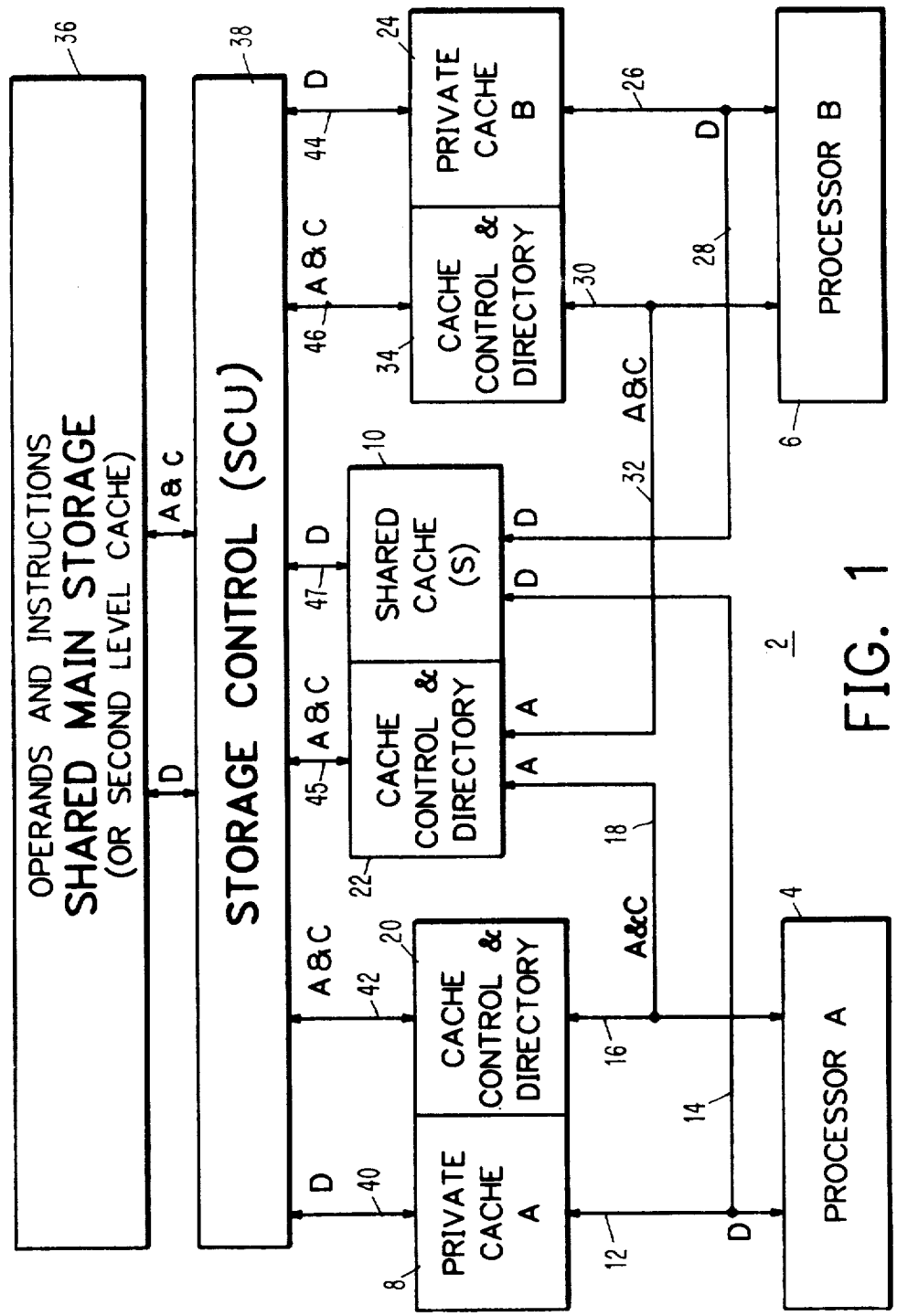
FIG. 1 is a block diagram representation of a mltiprocessing system including a shared cache.

A multiprocessing system including a shared cache is set forth generally at 2 in FIG. 1. Before describing the system operation, terminology used in describing the invention is set forth below.

A "cache line" is a unit of transfer between main memory and the cache. However, a bus may be less than a line wide. A cache line of information normally contains many CPU words. The cache directory holds an entry for each line of information in the cache indicating which main memory lines are presently in the cache.

A "cache hit" is defined as follows: if the line of information containing the word addressed by the CPU is resident in the cache then it is referred to as either a fetch hit or a store hit depending on the type of request. A cache hit requires a directory compare and a valid flag equal to ONE.

A "cache miss" is defined as follows: if the line of information containing the word addressed by the CPU is not resident in the cache then the CPU request results in either a fetch miss or a store miss depending on the request type. Either an address non compare or a valid bit equal to ZERO will cause a line miss. On a miss, the requested line must first be transferred into the cache before the reference can be completed. Some designs concurrently send the target word directly to the CPU so that processing can resume immediately.

"Invalidation" is the process of removing a valid line of information from the cache, and it is accomplished by setting the valid bit to ZERO. If the line has been changed, as indicated by a change flag equal to ONE, the line is first moved out of the cache before invalidating, that is, setting the valid flag to ZERO.

"Cross-interrogation" (XI) is the action of interrogating other (remote) CPU private caches on the occurrence of a line miss at the requesting CPU. The presence or absence of the target line in the remote cache is called either XI hit or XI miss respectively.

Each line in the cache has an associated entry in the associated directory which, besides containing the main memory address of the line currently in the cache, contains three flag bits, termed "line status-bits", which indicate the status of the cache resident line. The three line status bits are:

"Valid" (V) bit; if the cache does not contain a valid line at this location, then the V bit is set to ZERO. For example, at "power-on" all V bits are reset to ZERO, indicating all lines are invalid. A valid bit of ZERO always causes a line miss. The V appropriate bit is turned off (it may already be off), on a line miss and turned on when a new line is brought into the cache.

"Change" (CH) bit; if a line in the private cache is stored into, then its CH bit is set to ONE, indicating it has been changed relative to the contents of main memory. The CH bit is also set to ONE when a line is moved from the shared (S) cache to a private cache. Because all lines in the S cache are changed, no change bit per line is required in the S cache. The CH bit is set to ZERO when a line is brought into a private cache from main memory or from a remote cache. Major resets such as "power on" reset all CH bits to ZERO.

"Read-only" (RO) bit; the RO bit allows a line to concurrently reside in more than one private cache. Only reading (fetching) is permitted when the RO bit is ONE. A store to a RO line causes a miss. Invalidation or a line miss sets the RO bit to ZERO. Major resets such as "power on" also sets the RO bit to ZERO.

The multiprocessing system 2 includes a plurality of processors, such as the processors A and B which are designated as 4 and 6 respectively. It is appreciated that a greater number of processors may be utilized in the practice of the invention, however, only two such processors are shown for ease of explanation. Each processor communicates directly, for information exchange purposes, with a private cache, and each processor communicates directly with a shared cache which is shared by each of the processors in the multiprocessing system. Processor A communicates with its private cache 8 and a shared cache 10, with data exchange being provided via lines 12 and 14 respectively. Address and control information is provided via lines 16 and 18 to cache control and directories 20 and 22 for private cache 8 and shared cache 10 respectively.

Processor B exchanges data with its private cache 24 and shared cache 10 via lines 26 and 28 respectively. Address and control information is provided via lines 30 and 32 to private cache B's cache control and directory 34 and cache control directory 22 of the shared cache 10 respectively.

Each processor communicates with a main storage or memory device 36 via a storage control unit (SCU) 38. Processor A communicates data, and addresses and control information via lines 40 and 42 respectively from the private cache 8 and its associated control and directory 20. Processor 6 communicates data and address and control information via lines 44 and 46 respectively to the SCU 38 from its private cache 24 and its associated control and directory 34 respectively. Data and address and control information is exchanged between the SCU 38 and the main storage 36 via lines 48 and 50 respectively. Each processor, as set forth above, respectively, communicates directly with its private cache and the shared cache. If a requested piece of information or word is not resident in either of these caches, then the memory address along with the fetch or store request is communicated to the SCU 38. SCU 38 controls all communication between main storage 36 and the respective processors and caches. The SCU 38 has resident therein copies of each of the cache control and directories of the respective private caches. That is, a copy of directories 20 and 34 are resident in SCU 38. Thus, when a given processor requests a line of information from main storage 36, the SCU control logic also cross interrogates (XI) the copy of the other processor's cache directory to determine if the line is in a remote private cache.

A processor memory request predetermined sequence of operation will be described for processor A, with the understanding that a memory request sequence for processor B is similar. A serial predetermined sequence of interrogation or memory request is set forth for ease of explanation. The sequence is to interrogate CPU A's private cache, than the shared cache, than cross interrogate CPU B's private cache and last interrogate main memory. It is to be appreciated, that other predetermined sequences of interrogation are contemplated in the practice of the present invention. For example, the sequence may start with the concurrent interrogation of CPU A's private cache and the shared cache, with the sequence than proceeding as set forth above. A processor A memory request is first provided via line 16 to cache control and directory 20 for private cache A. The type of request, either a fetch or a store, is indicated by appropriate control signals on the line 16. If the target word is resident in the cache 8, as indicated by a directory address compare and a valid bit equal to ONE the cache control logic and directory 20 signals processor A accordingly, and the fetch or store takes place at cache A. The requested data is then either provided to or from processor A depending upon whether the request was a fetch or store.

If the target word is not resident in private cache 8, a second request for the memory word is then provided to the shared cache 10. As indicated above, a miss is indicated by the lack of a directory address compare or the valid bit being equal to ZERO. The processor A accesses the shared cache 10 sending the target address and fetch or store signal over the line 18 to the cache control and directory 22. Priority logic circuitry therein, determines which processor, that is processor A or processor B, receives priority when multiple requests occur simultaneously. When a given processor is selected, its address and request are gated to the shared cache 10 and they are handled as in the private cache. That is, if there is a directory compare and the valid bit equals ONE, the request is accomplished at the shared cache, and the appropriate data is exchanged between processor A and shared cache 10. If, on the other hand, there is no directory compare or if the valid bit equals ZERO, the shared cache logic and directory 22 signals to processor A that a shared cache miss has occurred.

One difference that takes place at the shared cache is that there is update/replacement array and logic per processor, thus on a hit, the requesting processor's replacement array is updated to indicate which of the four lines, assuming a four way set associative cache, is being referenced. In this way, each processor's reference activity is known at the shared cache. Thus, when a particular processor must move a line from its private cache to the shared cache, its shared cache least recently used (LRU) array indicates which of the four lines it has referenced least recently, and this line is first moved out of the shared cache before moving a changed line from the private cache to the shared cache. Consequently, lines that are no longer being shared, that is, one processor is no longer referencing, will not be kept in the shared cache once sharing has ceased.

If a fetch or store miss occurs successively when referencing the private cache 8 and the shared cache 10, the third step occurs, that is, to determine if the requested line is in the private cache of one of the other processors in the multiprocessing system. The address and fetch or store signal is provided to the SCU 38 via the line 42 from directory 20. SCU 38 cross interrogates the copy of processor's B directory which is maintained therein. If the line is present in processor B's cache, as indicated by a B directory hit, the SCU 38 signals processor B to do a fetch XI operation. Processor B accesses its directory 34 and does an address compare. In response to the directory access, there is an address compare and a valid bit equal to ONE. Processor B also tests the associated change bit status, which if ZERO will cause the SCU 38 to request the line from main memory 36 and transfer it to the A processor's cache along with a signal to set the R0 flag bit to ONE. This leaves a copy of the line in each processor's private cache for fetching, however this line can't be stored into. If a store is attempted, it will not be allowed and a store cache miss is signaled.

If on a fetch miss and a cross interrogate (XI) hit the change flag is equal to ONE, this indicates both sharing and changing, causing a line to be transferred from private cache 8 to the shared cache 10. First, however, the least recently used line must be moved out of the shared cache 10 to take room for the target line to be moved in. No change flag per line need be provided in the shared cache 10 because all lines in the shared cache are changed or they would not be resident therein. The shared cache directory 22 contains the main memory address of where the line being replaced should be transferred to in main memory. The SCU 38 initiates and controls the transfer of the replaced line to the shared cache 10 to the main storage 36. The SCU 38 also initiates the transfer of the target line from the private cache 24 of processor B to the SCU 38 where it is held in a line buffer. The SCU 38 then transfers the target line to the shared cache 10 along with its memory address for storing in the shared cache directory 22.

A store miss and a XI hit indicate both sharing and changing independent of the change bit in the remote processor's B cache 24, as a store changes the data. Consequently, the target line is moved to the shared cache 10. If the change bit, CH=0, the SCU 38 transfers the line from main memory 36 to the shared cache 10. If CH=1, the SCU 38 signals processor B to cast out the target line to the SCU 38 and then it is transferred to the shared cache 10. In either case, the line to be replaced in the shared cache 10 is first moved to main storage 36 before transferring the target line to the shared cache 10 along with its main memory address. Also, in either case the target line is invalidated at the private cache 24 of processor B by setting the valid bit to ZERO.

The detailed operations of the respective units in the system will be now described.

Figure 2:
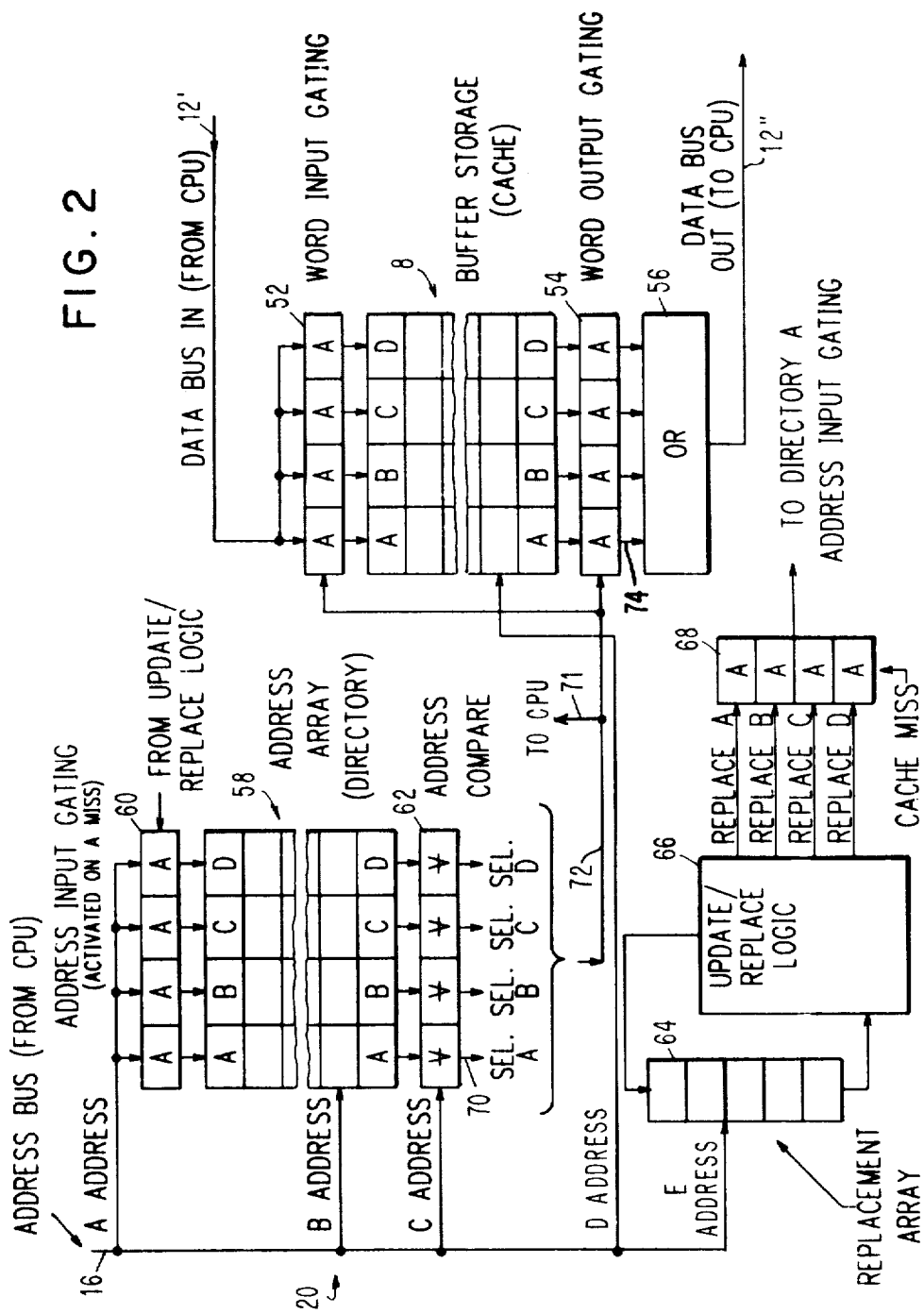
FIG. 2 is a block diagram representation of the typical four-way set associative private cache, directory and LRU replacement array/logic which is shown generally in FIG. 1.

Refer now to FIG. 2 which is a detailed block diagram representation of the private cache 8 and its associated cache control and directory 20 for processor A. The private cache 24 and its associated cache control and directory 34 for processor B is identical and operates in the same manner as is to be described. The system shown is a typical four way set associative cache, directory and update/replacement array and logic. The private cache 8 includes a word input gating network 52, a word output gating network 54 and an OR gate 56.

The cache control and directory 20 includes an address array 58, address input gating 60 and an address compare network 62. The update replacement array is comprised of a replacement array 64, update/replace logic 66 and address gating network 68.

Figure 3:
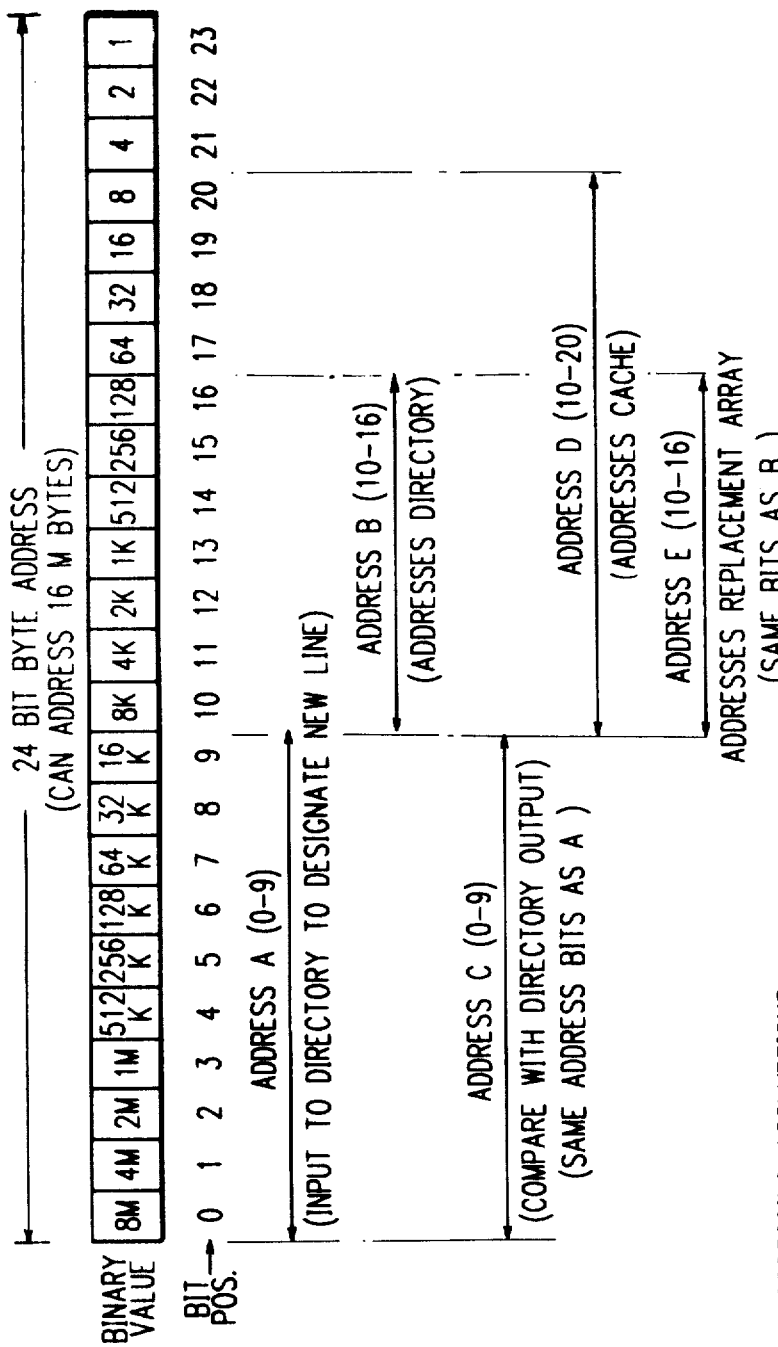
FIG. 3 is a diagram indicating how the bits of an assumed 24-bit memory address are assigned to the major elements of the private caches.

The address on line 16 from processor A is used to address the directory, cache and replacement array. FIG. 3 is a diagram indicating how the bits of an assumed 24-bit memory address are assigned to the major elements set forth in FIG. 2. The A address is provided to the address input gating logic 60 and the B address to address array 58, and the C address to address compare network 62. The four addresses which are concurrently read out of the directory 58 to the address compare network 62 are compared with the proper bits of the memory address on the C address line to determine which of the four addresses, if any, compare. For example, if the A address compares and its valid bit equals ONE, then the A word is read out of the cache. This is accomplished by a gating signal on the select A line 70 being provided via line 72 to the buffer cache 8 and the word output gating 54. The select A signal is also provided, via line 71, to processor A for purposes to be explained later. Line 74 from word output gating 54 provides the requested data to OR gate 56 and to data bus out 12". If none of the four words compare, then a miss signal is generated. If a store operation is to be accomplished, data in on the bus 12'is provided to the word input gating 52 and the select A signal on line 72 enables word input gating 52 to provide the data in to the buffer storage cache 8.

The replacement array 64 and its associated logic network 66 and 68 keep track of which of the four lines in each set associative class has been least recently referenced or used. The details of least recently used (LRU) replacement logic is described in U.S. Pat. No. 4,008,460 which is assigned to the assignee of the present invention, and accordingly the operation of the logic will not be described in detail herein.

Refer now to FIGS. 4.1 and 4.2 which set forth the four way set associative shared cache, directory and update/replacement array and logic. The logic set forth operates in a manner similar to that for a private cache as set forth in FIG. 2, with the difference being that a CPU priority logic network 75 is needed to determine which processor or the SCU receives priority when multiple requests occur. Store or fetch requests from processor A, processor B and SCU 38 are provided on lines 76, 78 and 80 to the inputs of the CPU priority logic network 75. The logic network 75 is a standard type logic network which provides a select output signal on output lines 82, 84 or 86, dependent upon which of the requesting devices provide the first request. In the event there are concurrent requests, the highest priority unit will be selected.

Respective select signals for controlling gating of the remaining logic in a network for selecting processor A (SELECT CPU A), processor B (SELECT CPU B), or SCU 38 (SELECT SCU) is provided on the lines 82, 84 and 86 respectively.

Since the shared cache network is responsive to addresses from processor A, processor B and SCU 38, a gating network comprised of AND gates 88, 90, 100 and OR gate 102 are needed to gate in the proper address dependent upon the selection process from priority logic network 75. AND gate 88 has as its two inputs the SELECT CPU A signal on line 82 and the CPU A ADDRESS BUS signal on line 18. Therefore, if both of these signals are active, the address on address bus 18 is provided on output line 103 of the AND gate 88 to a first input of the OR gate 102 for provision on output line 104 to the shared directory network 22. AND gate 90 has provided to its first input on line 84 the SELECT CPU B signal from the CPU priority logic 75, and has provided to a second input line 32 a CPU B ADDRESS BUS signal. If both of these signals are active, the signal on input line 32 is gated to the output line 104 of gate 90 to the second input of OR gate 102 for provision to the output line 104 thereof. AND gate 100 has the SELECT SCU signal on line 86 supplied to a first input thereof, and the SCU ADDRESS BUS signal applied on line 45 to the second input thereof. If both of these signals are active, an output signal is provided on line 108 to the third input of OR gate 102 for provision to the output line 104 thereof. The shared directory network operates in a manner similar to the address array network 58 set forth in FIG. 2, and therefore the details thereof will not be set forth. Suffice it to say, when the address C on line 110 compares with one of the four addresses present in the directory compare unit 112, a SELECT signal is provided on output line 114 to the shared cache 10 for selecting that address in the shared cache 10 to either gate in data provided on input line 116 or to gate out data provided on line 118. The SELECT signal on line 115 is also provided to processor A for purposes to be explained later.

Assuming that it is a store request, data input signals from processor A, processor B and SCU 38 are provided on input lines 14', 28' and 47' respectively to first inputs of AND gates 120, 122 and 124. SELECT signals are provided to the second inputs thereof from processor A, processor B, and SCU 38 on input lines 82,84 and 86. Dependent upon which of processor A, processor B or SCU 38 is selected, the data in is gated through the appropriate gate to the output lines 126, 128 and 130 of gates 120, 122 and 124 respectively to the three inputs of an OR gate 132 for provision of the selected data to the output line 116 for provision to the shared cache.

Assuming that there is a fetch request, the data out from the shared cache 10 on line 118 is provided to first input 134, 136 and 138 of AND gates 140, 142 and 144. Select signals for processors A, processors B and SCU 38 are provided to second inputs 146, 148 and 150 of the AND gates 140, 142 and 144 respectively.

Dependent upon which of the processors or SCU is selected, data out is provided on output lines 14'', 28'' and 47'' from the gates 140, 142 and 144 respectively. The replacement array network in the shared cache system, operates in a manner similar to that set forth for a private cache. The E address is provided on bus 152 to a replacement array 154 for processor A, and a replacement array 156 for processor B. As with the other logic elements in this network, a selection process is required. AND gate 158 is provided the SELECT SCU signal on line 86 to its first input, and a CPU A signal 88 to its second input. A SELECT signal is provided on an output line 162 when these two signals are concurrently active which is indicative that the SCU is controlling the replace logic with inputs from the processor A cache. An AND gate 164 has the SELECT SCU signal on line 86 provided to a first input thereof and a CPU B signal on line 166 to the second input thereof, which sets forth that the SCU is controlling the network with inputs from the processor B, with an output signal being provided on line 168 when both of these signals are concurrently active. An OR gate 170 has the output signal on line 162 from AND gate 158 applied to the first input thereof and the SELECT CPU A signal on line 82 as the second input thereof, with an output signal appearing on line 172 to the replacement logic network 174 when either of these inputs is active. An OR gate 176 has the output signal on line 168 from the AND gate 164 applied to the first input thereof and the SELECT CPU B signal on line 84 applied to the second input thereof to provide an output signal on line 178 to the replacement logic network 174 when either of these input lines is active. Dependent upon which of the processors is to replace a line of information, and which line thereof, REPLACE LINE A, LINE B, LINE C and LINE D signals are provided on output lines 180, 182, 184 and 186 respectively for provision to line 190 as an ADDRESS IN GATING signal for the shared directory 22.

Figure 5:
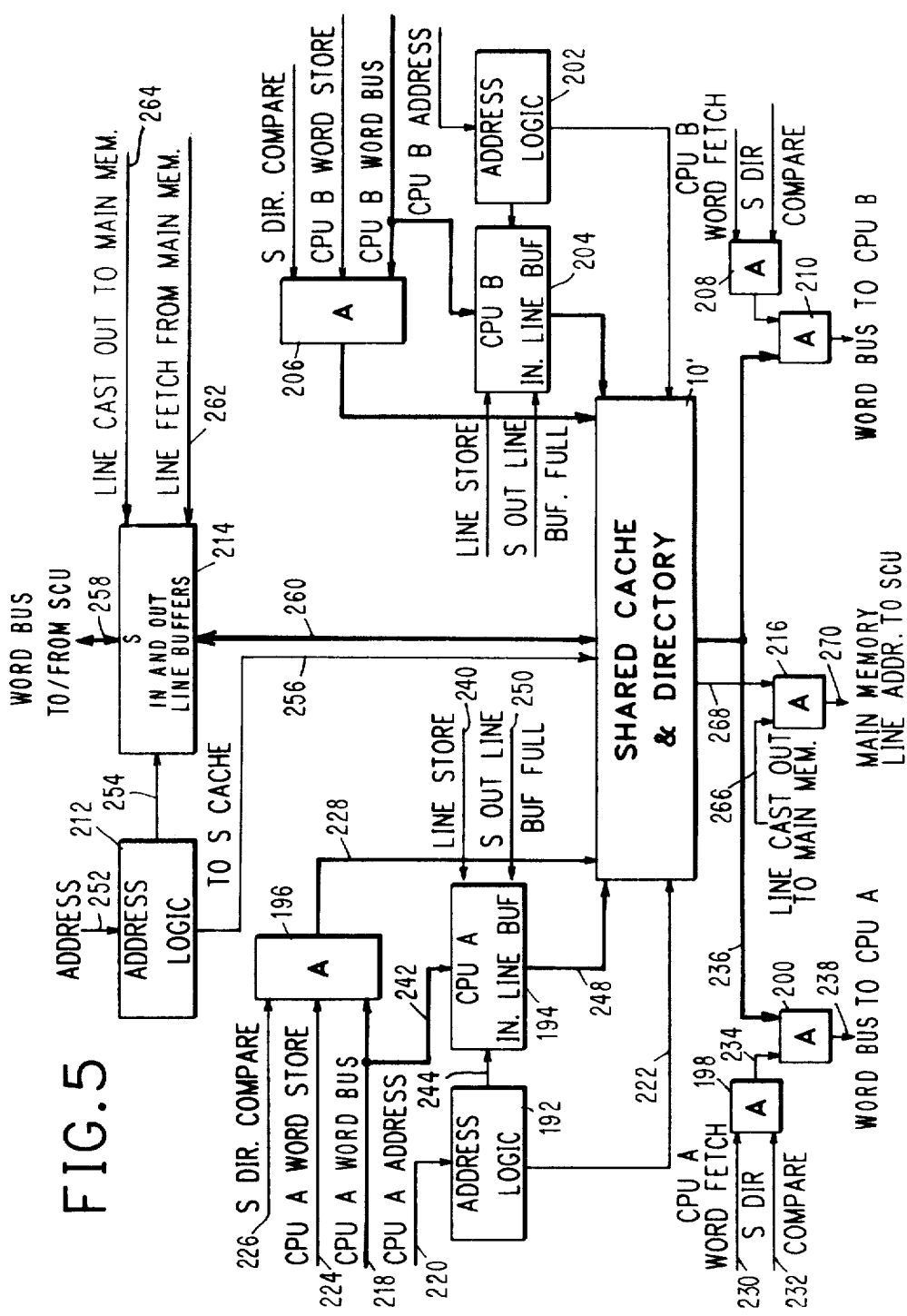
FIG. 5 is a block diagram representation of the shared cache, including the shared cache data flow.

Refer now to FIG. 5 which is a block diagram which illustrates the data flow for transferring words and lines between processors and the shared cache, as well as the data flow for transferring lines between the SCU and the shared cache in the multiprocessing system. All of the AND gates in FIG. 5 have an additional SELECT input (not shown), such as "SELECT CPU A" or "SELECT SCU" to insure that only one set of gates is active at any one time. The shared cache and directory which is set forth in detail in FIGS. 4.1 and 4.2 is illustrated as 10'. There are three separate logic networks that operate with the shared cache and directory 10', with these three logic networks being dedicated to processor A, processor B and the SCU 38 respectively. The logic network associated with processor A is comprised of ADDRESS LOGIC network 192, CPU A IN LINE BUFFER 194, and AND gates 196, 198, and 200. The logic network associated with processor B is comprised of ADDRESS LOGIC network 202, CPU B IN LINE BUFFER 204, and AND gates 206, 208, and 210. The logic network associated with SCU 38 is comprised of ADDRESS LOGIC network 212 S IN/OUT LINE BUFFERS 214 and AND gate 216.

The operation of the logic network for processor A will be described, with the understanding that the logic network for processor B operates in a like manner. When a word is to be stored into shared cache 10', the data which is comprised of an 8 byte word is provided to the CPU A WORD bus 218 as a first input to the AND gate 196. The address for the particular word is provided to CPU A ADDRESS BUS 220 as the input to the address logic network 192 with the address then being provided at a first output of the address logic 192 on output line 222 to the shared cache and directory 10' to indicate where the word is to be stored. Processor A designates a word store operation by providing a CPU A WORD STORE signal on line 224 to the second input of the AND gate 196. In response to a S DIRECTORY COMPARE signal being applied to line 226, the third input of AND gate 196, the word to be stored is provided on the output line 228 from the AND gate 196 to the shared cache and directory. As previously described relative to a private cache, the CPU A ADDRESS signal provided on line 220 is 21 bits wide as set forth in FIG. 3. Address bits 10-16 address the directory, address bits 0-9 are compared with the directory output and address bits 10-20 address the S cache.

A word fetch from the shared cache is signaled by activating the CPU A WORD FETCH line 230 provided to the first input of the AND gate 198. In response to the concurrent application of a S DIREC- TORY COMPARE signal on line 232 from the shared directory 22 set forth in FIG. 4.1, the AND gate 198 is activated to provide a gating signal on line 234 to the first input of AND gate 200 for gating out the word on line 236 from the output of the shared cache and directory 10' on output line 238.

When an entire line is to be cast out from out from processor A to the S cache, the LINE STORE signal from processor A is provided on line 240 to the CPU A INPUT LINE BUFFER 194. Processor A also provides the first 8 byte word on a double word bus 218 to input line 242 of buffer 194 along with its appropriate address which is provided on line 244 from address logic network 192. Lines cast out from processor A to the S cache always begin at the left-most end of the line and transfer from left to right until the entire 16 words are transferred into the line buffer 194. The line buffer 194 assembles 8 bytes at a time, that is the entire 128 byte line. The line buffer 194 permits processor A to transfer the words at its speed and then disconnect. The shared cache can then write the line into the cache via line 248 independent of the sending processor, in this instance processor A. The address logic network 192 increments the address which is used both in addressing the S cache via line 222 and in controlling the gating of the line buffer 194 via line 244. Address logic 192 also stores the line address in the directory once the line is stored in the S cache. The line cannot be written into the S cache until the line to be replaced has been completely read out of the S cache as indicated by a S OUT LINE BUFFER FULL signal provided on line 250 to the CPU A in line buffer 194.

There are no single word transfer between the S cache 10' and the SCU 38, that is, only line transfers take place between these two units. Also, while each of the processors only stores lines to the S cache 10', the SCU 38 both fetches and stores lines to/from the S cache 10'. Address logic 212 receives the appropriate address via line 252 from the SCU 38, with appropriate address information being provided to S IN/OUT LINE BUFFERS 214 via line 254 and to the shared cache and directory 10' via line 256. Words are provided to and from the SCU 38 from the S IN/OUT LINE BUFFERS 214 via line 258, with words being provided to and from the in/out line buffer 214 to the shared cache and directory 10' via the line 260. Line fetches from main memory via the SCU 38 are signalled via line 262, and line cast outs to main memory via the SCU 38 are signalled via line 264. When lines are to be cast out to main memory, the first input to AND gate 216 is activated on line 266 for gating the line address on line 268 to the output line 270 of AND gate 216.

Figure 6:
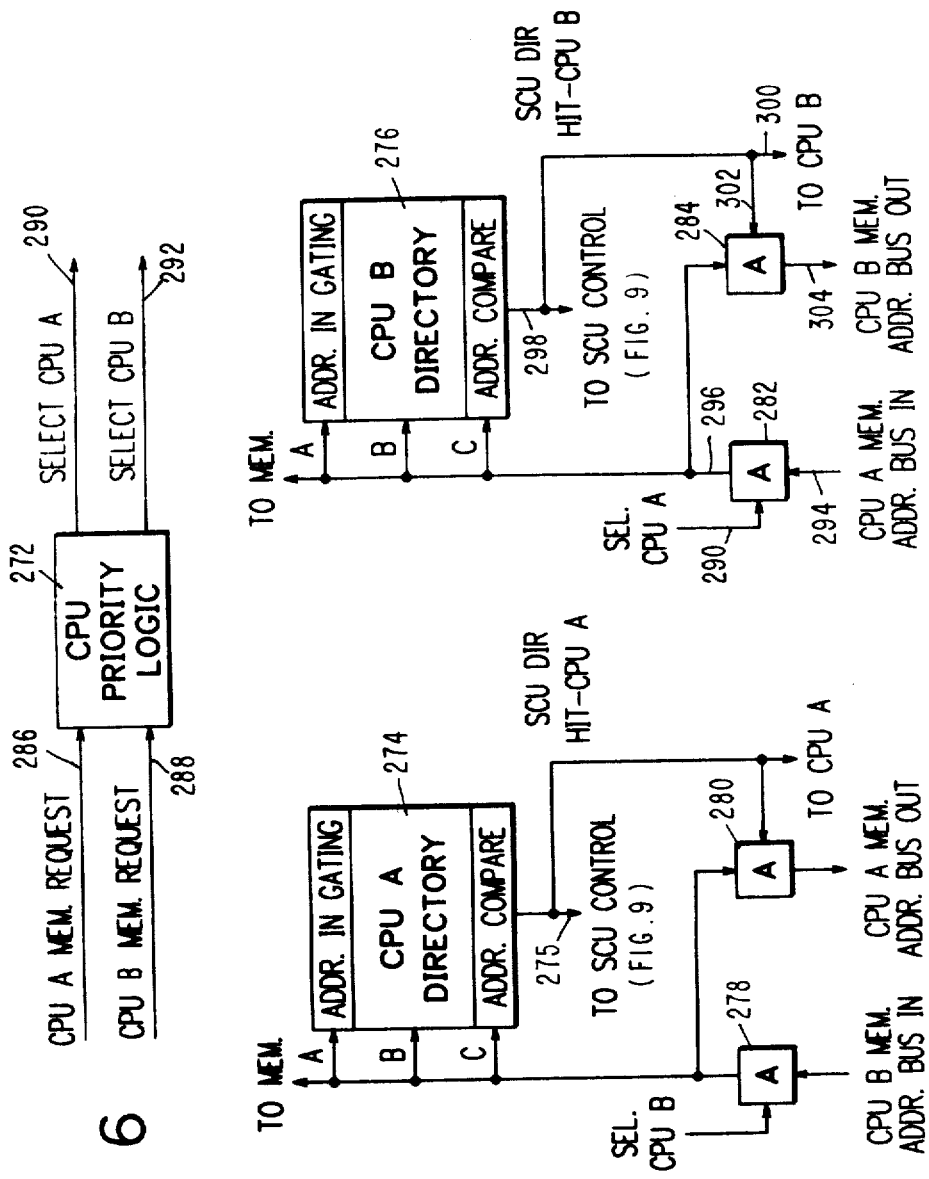
FIG. 6 is a block diagram representation of the copies of the private cache directories and address gating in the storage control unit (SCU) which is shown generally in FIG. 1.

FIG. 6 is a block diagram representation of a portion of the SCU 38 logic, including the copies of the private cache directory 20 and 34 for processors A and B respectively. The logic network includes a CPU priority logic network 272 and copies of processors A and B directories 274 and 276 respectively. AND gates 278 and 280 are associated with processor A directory 274, and AND gates 282 and 284 are associated with processor B directory 276. A processor A MEMORY REQUEST is provided via line 286, and a processor B MEMORY REQUEST is provided via line 288 to logic network 272. Logic network 272 responds to either one or both of these requests to provide a SELECT CPU A or SELECT CPU B gating signal on lines 290 and 292 respectively. As previously set forth, the SCU 38 handles cross-interrogation (XI) requests for determining if a line requested by a given processor from memory is located in the other processor's cache. This is accomplished by cross-interrogating the copy of the other processor's private directory which is maintained in the SCU 38. That is, processor A interrogates processor B's directory 276, and processor B interrogates processor A's directory 274. The SCU circuitry is fast enough to handle communications from multiple processors because the processors communicate with the SCU on a per miss basis rather than each processor word reference. The directories in the SCU are identical with their counterparts in the private caches, with the exception that there is no change (CH) flag in the SCU directories because it changes on a processor reference rather than only a miss.

Consider the situation in which processor A has successively interrogated its private cache and the shared cache to fetch a line, and a fetch miss has occurred in both instances. The processor A then interrogates the SCU 38, with a CPU A MEMORY ADDRESS BUS IN signal on line 294 of AND gate 282. Since processor A is making the request, priority logic network 272 provides a SELECT CPU A gating signal on line 290 to AND gate 282 for providing the memory address to output line 296 and thence to AND gate 284 and CPU B directory 276 for purposes of cross-interrogation. If there is a XI miss, that is the address is not found in processor B's directory 276, the XI miss is signaled on line 298 to the SCU control network and to processor B on line 300 and to gating input 302 of AND gate 284 by the respective lines being inactive. Accordingly AND gate 284 is disabled at this time. If on the other hand, the requested address is found in directory 276 the signal on output line 298 is active providing a gating signal on line 302 to gate 284 for providing a CPU B MEMORY ADDRESS BUS OUT signal on line 304 to processor B's cache control and directory unit 34 and a gating signal is provided on line 300 to processor B indicating that this address is to be used in referencing processor B's private cache directory. The main reason for accessing the directory on a XI hit is to check the "change flag" status. The specific details of how these misses or fetches are handled will be described relative to the SCU logic set forth in FIGS. 9 through 11.

Figure 7:
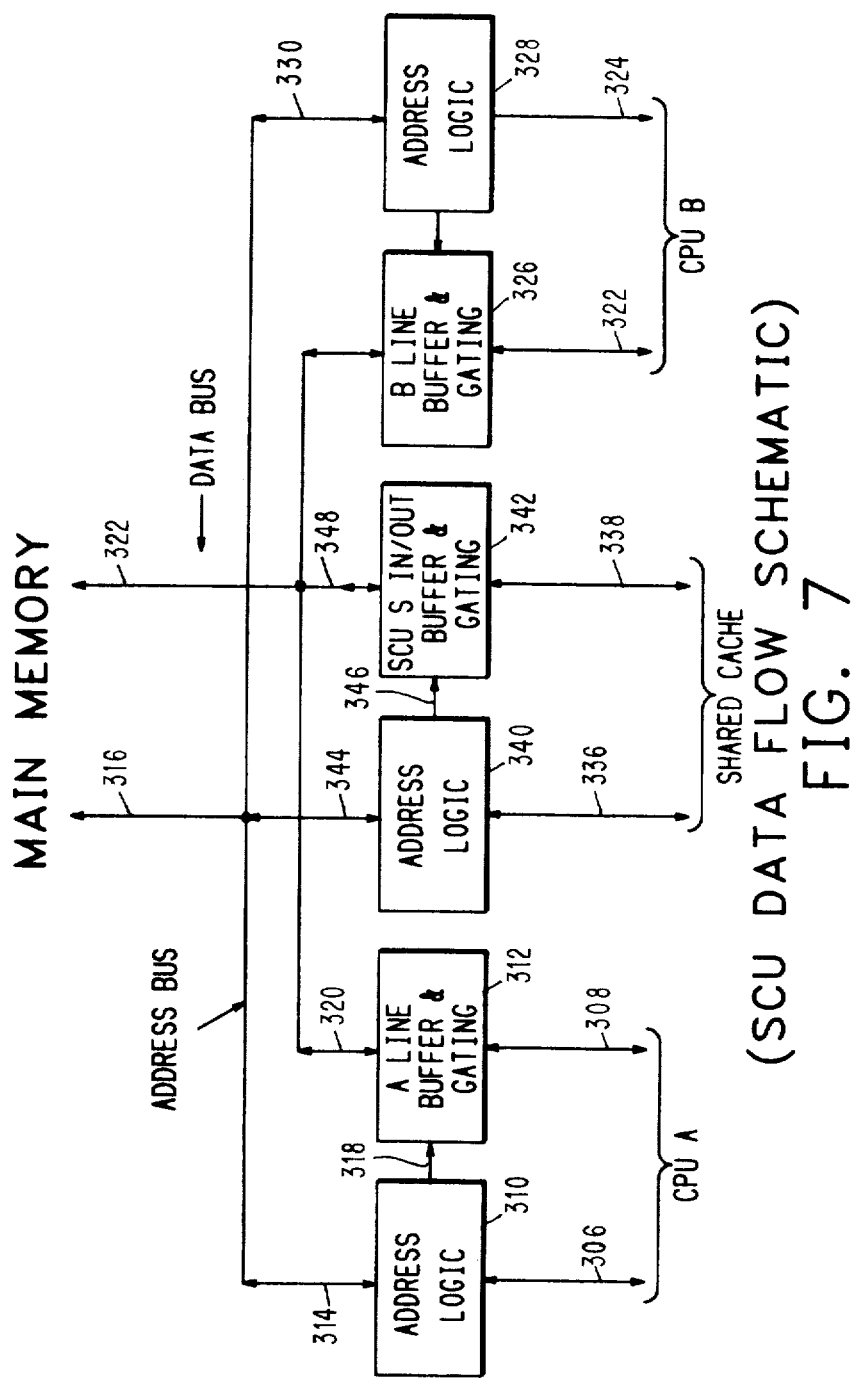
FIG. 7 is a block diagram which sets forth the data flow in the SCU.

FIG. 7 is a SCU data flow schematic for illustrating how data flows from the private and shared caches to the SCU and to the main memory unit. Processor A address and data information is provided via lines 306 and 308 to address logic network 310 and A line buffering and gating network 312 respectively. The address logic network 310 provides an address signal to bus 314 and to the main memory address bus 316, as well as address gating information via lines 318 to buffering and gating network 312. Network 312 responds to the address information on line 318 for gating the data information on line 308 to data bus 320, and thence to word data bus 322 for the main memory network 36. Processor B provides address information on bus 322 and data information on bus 324 to B line buffering and gating network 326 and address and logic network 328 respectively. Address logic network 328 provides an address signal to bus 330 and thence to main memory address bus 316, as well as providing address gating information on line 332 to buffering and gating network 326. Network 326 responds to the address information on line 332 for gating the data on bus 322 to bus 334 and thence to main memory data bus 322. Address information from the shared cache is provided on bus 336 and data information from the shared cache on bus 338 to address logic network 340 and SCU S in/out buffer and gating network 342 respectively. Address logic network 340 responds to the address information on bus 336 for providing address information on output bus 344 and thence to main memory address bus 316, as well as providing an address gating signal on line 346 to the buffering and gating network 342 for gating the data information on bus 338 to output bus 348 and thence to main memory data bus 322. In each instance, the data and information addressing networks operate in a reverse manner when processing address and data information from main memory to the respective private and shared caches.

Figure 8:
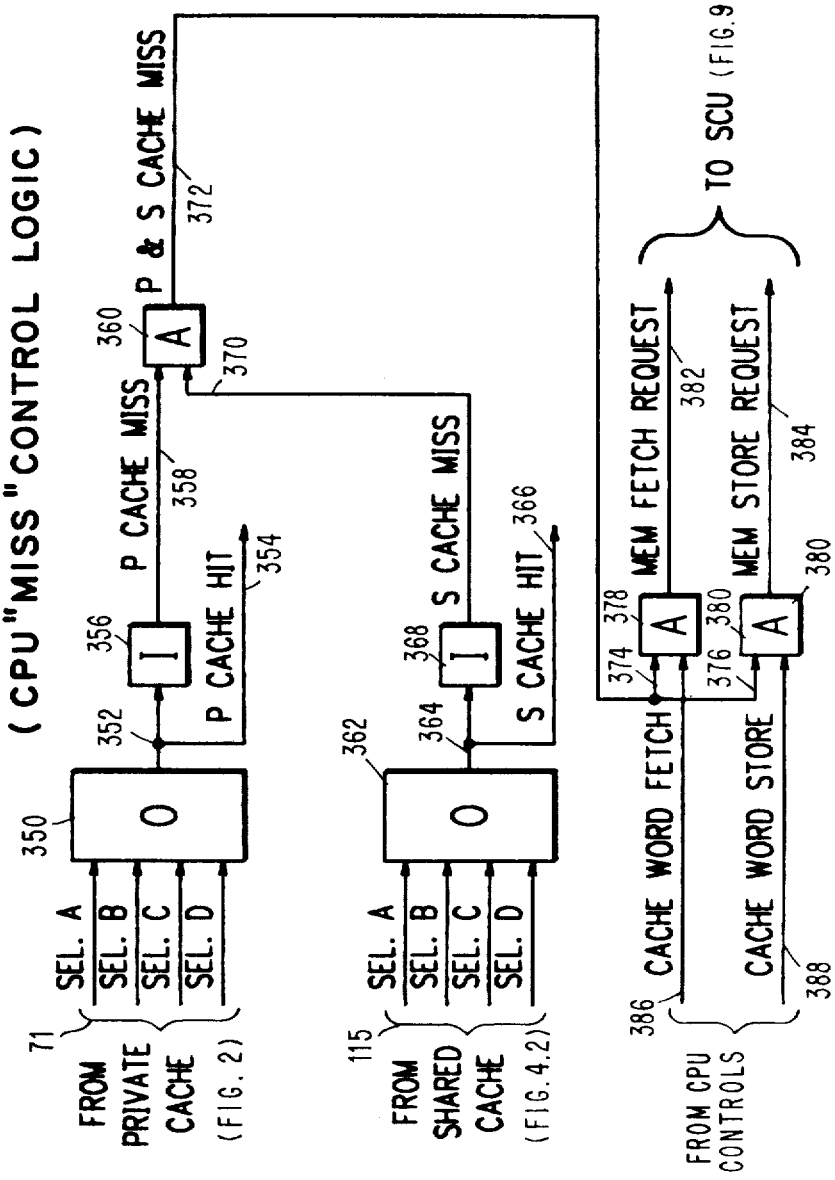
FIG. 8. is a block diagram of the miss control logic found in each processor.

FIG. 8 sets forth the CPU "miss" control logic which illustrates how, following a private and shared cache miss, a processor memory request to the SCU, be it a fetch or store, is generated. As set forth relative to FIG. 6, the memory request signal is provided to the CPU priority logic which selects which processor gains control of the SCU directories in the event of multiple memory requests in the same machine cycle. OR gate 350 has provided to its four inputs the SEL.A signal, the SEL.B signal, the SEL.C signal, and the SEL.D signal on bus 71. As previously set forth relative to the explanation of the cache control and directory circuit of FIG. 2, one of these signals is active whenever a given one of the four words which is selected is present in the directory. If none of the signals are present, each of these signals is inactive. Assume that one of these signals is active from the private cache directory, therefore, the output of the OR gate 350 on line 352 is active and a private cache hit signal is provided on line 354 to the private cache directory via line 354. The active signal state on line 352 is inverted by inverter 356, with this signal being provided on line 358 to the first input of an AND gate 360, thereby disabling the AND gate. An OR gate 362 is provided the SEL. signals A through D on bus 115 from the shared cache (FIG. 4.2), with all of these lines being inactive when there is a shared cache miss, and a given one of the lines being active when there is a hit. Assume that there was a shared cache hit and the output line 364 from OR gate 362 is active providing a SHARED CACHE HIT signal on line 366 to shared cache and directory unit 10 for application to the SCU. The active signal on line 364 is inverted by inverter 368 and applied to second input line 370 of the AND gate 360. This signal disables the AND gate 360, and an inactive signal is provided on the output line 372 of the gate 360 which is provided to first inputs 374 and 376 of AND gates 378 and 380 respectively, thereby disabling these gates such that the output lines 382 and 384 from these gates are inactive, thereby signaling to the SCU unit that there has been no memory fetch request or memory store request.

Assume that there has been a private cache miss as well as a shared cache miss such that each of the select lines provided to the gates 350 and 362 are inactive, such that the output lines 352 and 364, respectively are inactive. In this instance, inverters 356 and 368 invert these signals causing the lines 358 and 370 respectively to become active signaling a private cache miss and a shared cache miss respectively, thereby activating AND gate 360 and providing an active signal state on line 372, which is indicative of a private and shared cache miss occurring concurrently, to the first inputs 374 and 376 of AND gates 378 and 380 respectively.

In the event a cache word fetch was initiated, line 386 is activated such that AND gate 378 is enabled to provide a memory fetch request on output line 382 to the SCU. In the event a cache word store was initiated, line 388 is activated such that AND gate 380 is enabled to provide a memory store request on output line 384 to the SCU unit. As set forth above, these memory requests are utilized to activate the CPU priority logic 272 illustrated in FIG. 6 to initiate a cross-interrogate request or a main memory request. The details of how these requests are initiated will be described shortly relative to the following figures.

FIGS. 9-12 set forth the various logic sections that comprise the SCU XI control logic network. FIG. 13 is a table setting forth the actions on a XI hit for either requesting processor A or B. FIGS. 14 and 15 are logic flow diagrams setting forth the logic decisions made in response to fetch and store requests respectively. FIGS. 13-15 should be studied in conjunction with the respective descriptions to be set forth relative to FIGS. 9-12.

Figure 9:
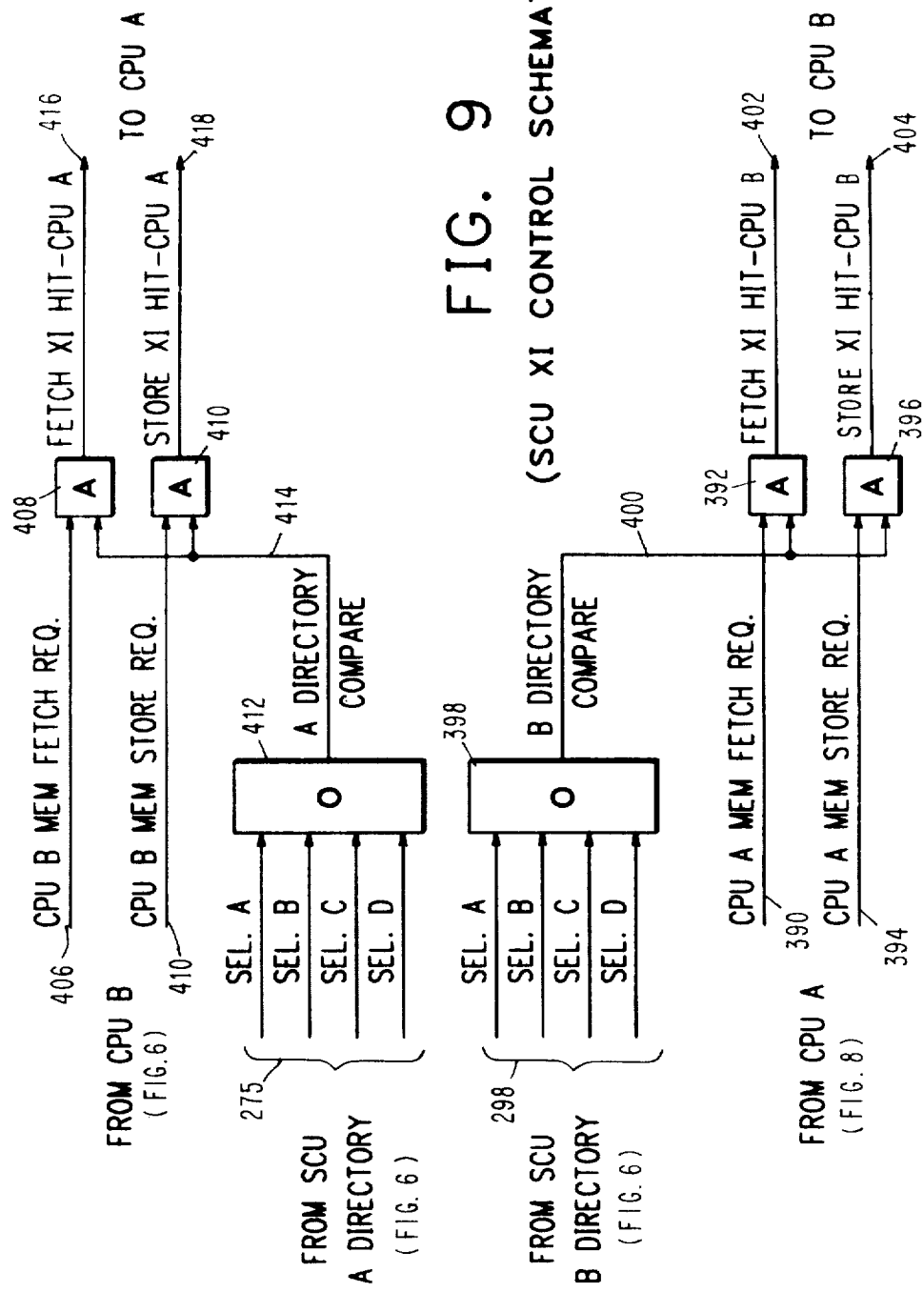
FIGS. 9 through 12 are block diagram representations of the SCU cross interrogation (XI) control logic.

FIG. 9 sets forth the SCU XI control logic for responding to processor memory request misses in both the private cache and the shared cache as previously set forth relative to FIG. 8, and thence to initiate a memory request to the SCU. A fetch or store memory request is provided to the SCU from the requesting processor. For example, if processor A is the requesting processor, a CPU A MEMORY FETCH REQUEST is provided on line 390 to the first input of an AND gate 392 and a CPU A MEMORY STORE REQUEST is provided on line 394 to a first input of an AND gate 396. The SCU uses the memory address from the requesting and selected processor to access the copy of the other processor's directory that is resident in the SCU as previously described relative to FIG. 6. For example, if processor A generates the request, then the copy of the processor B's directory is accessed in the SCU. If there is no compare, then the main memory is referenced and processor B is not signaled. If there is a directory compare, called "SCU DIRECTORY HIT-CPU B" as shown at line 298 in FIG. 6, then processor B is signaled to do either a fetch cross-interrogate or a store cross-interrogate. That is, the SELECT A-D signals on line 298 are provided to respective inputs of OR gate 398, and in response to one of these lines being active, a B DIRECTORY COMPARE ACTIVE signal is provided on line 400 to the second input of AND gates 392 and 396. If line 390 is active, AND gate 392 provides a FETCH XI HIT-CPU B signal to processor B on line 402, and if line 394 is active AND gate 396 provides a STORE XI HIT-CPU B signal on line 404 to processor B.

If a fetch XI HIT-CPU B signal is provided on line 402, processor B accesses its directory to test the change (CH) and read-only (RO) status bits. If the CH bit is zero, processor B sets its RO flag to one and signals "fetch XI complete" along with the signal that the change flag was zero. The SCU then requests the line from main memory for processor A, transmitting the line back to processor A's private cache and directory along with the signal turn on the RO flag. Processor A stores the line address in its directory and turns on the RO flag and valid flag, and turns off the CH flag even though it may already have been off.

If on the FETCH XI HIT-CPU B, the change flag is ONE in the directory of the private cache of processor B, then a cast out of the target line from processor B's private cache to the shared cache is required, as this indicates that a line is shared and changed requiring it to be transferred to the shared cache. Also, before the target line can be written into the shared cache, the LRU line currently in the shared cache must be cast out to the main memory by the SCU.

If processor B is the requesting processor, a CPU B MEMORY FETCH REQUEST is provided on line 406 to the first input of an AND gate 408, and a CPU B MEMORY STORE REQUEST on line 410 is provided to the first input of an AND gate 410. The SELECT signals A-D from the SCU A directory are provided on bus 275 to the respective inputs of OR gate 412, and in response to any of these signals being active, an A DIRECTORY COMPARE signal is provided on line 414 to the second inputs of AND gates 408 and 410 respectively. In response to both inputs of AND gate 408 being active, a FETCH XI HIT-CPU A signal is provided on line 416 to processor A, and in response to both inputs of AND gate 410 being active a STORE XI HIT-CPU A signal is provided on line 418 to processor A. The response by processor A and its associated cache and directory is identical to the response described for processor B relative to the cross-interrogate hits for the conditions when the CH flag equals ZERO and ONE respectively, and accordingly will not be described again.

Figure 10:
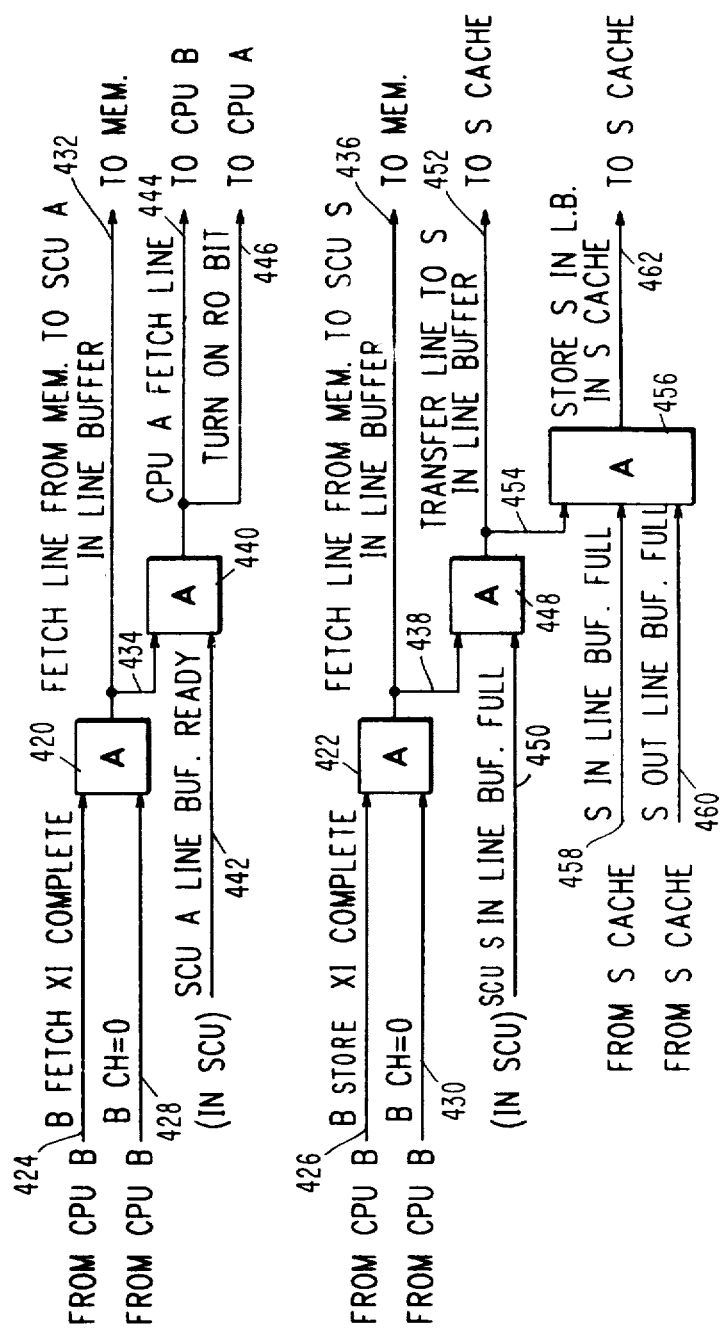
Figure 11:
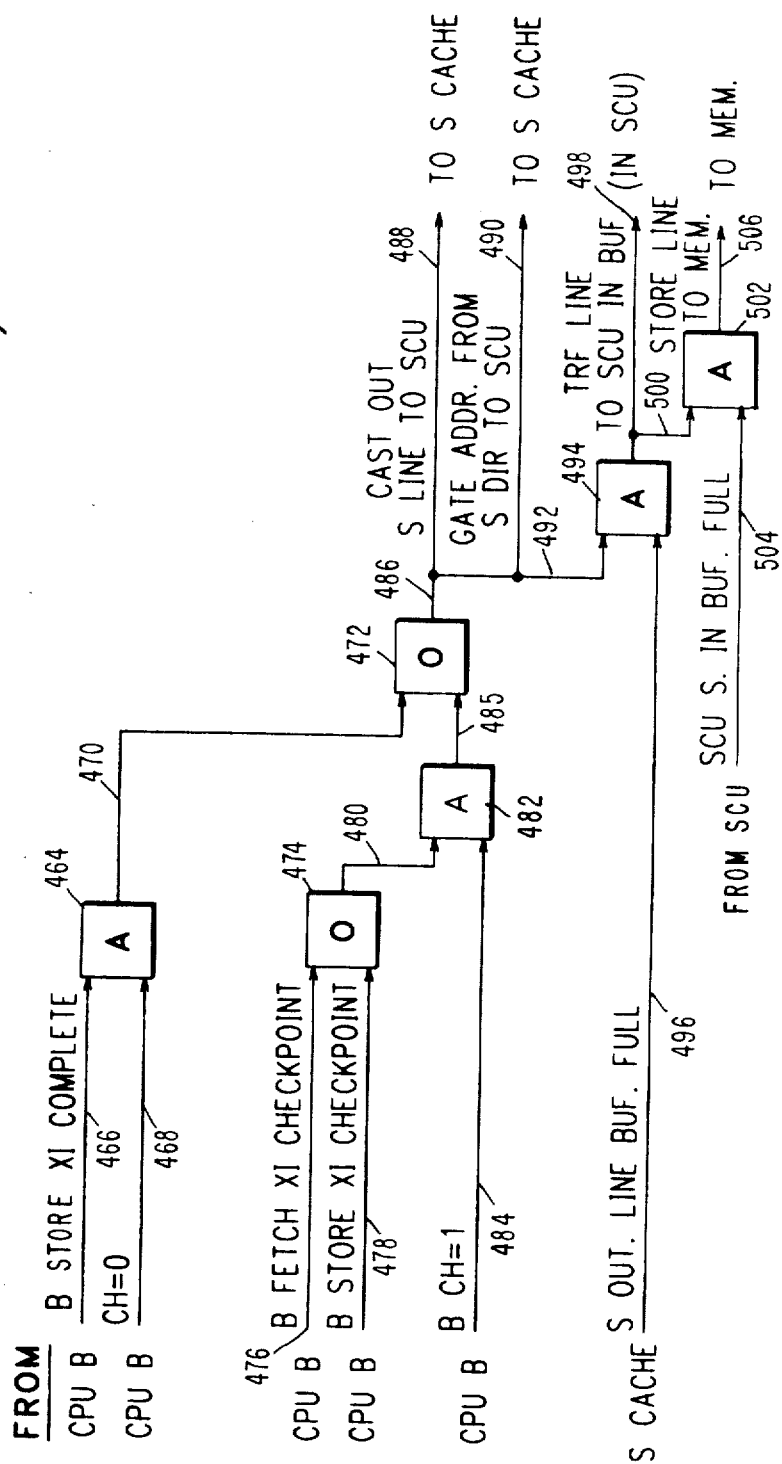

FIGS. 10-11 set forth control logic in the storage control unit 38 for processor B which functions in response to cross-interrogations from processor A. A similar set of control logic (not shown) exists in the SCU for processor A to respond to cross-interrogations from processor B.

Refer now to FIG. 10 which indicates the control logic operations in response to a cross-interrogate to processor B when the change bit (CH) equals ZERO and the cross-interrogate fetch is complete. AND gate 420 receives B FETCH XI COMPLETE signal on first input line 424 and B CH=0 signal on input lines 428. In response to both of these signals being concurrently active AND gate 420 provides an active output to lines 432 and 434. The active signal on line 432, which is the FETCH LINE FROM MEMORY TO SCU A BUFFER signal, is provided to the main storage to fetch this line to the SCU A IN LINE BUFFER. The active state of line 434 is provided to a first input of AND gate 440 which receives the SCU A LINE BUFFER READY signal on input line 442 to indicate when the fetched line from main memory is stored in the buffer. In response to both input signal lines of gate 440 being active, output lines 444 and 446 from AND gate 440 are active providing a CPU A FETCH LINE signal to CPU B, and a TURN ON RO BIT signal to CPU A. AND gate 422 receives the B STORE XI COMPLETE signal on first input line 426 and the B CH=0 signal on second input line 430. In response to both inputs to gate 422 being active, lines 436 and 438 become active to provide a FETCH LINE FROM MEMORY TO SCU S INLINE BUFFER signal to the main memory to fetch the requested line to the SCU. The active state of line 438 is provided to AND gate 448 in response to the second input line 450 being active which is indicative of the SCU inline buffer being full. AND gate 448 responds to the active state of both input lines to provide an active signal on output lines 452 and 454. The active state of line 452 is provided to the shared cache as the transfer line to the S inline buffer signal. AND gate 456 has applied to its second and third input lines 458 and 460 an S INLINE BUFFER FULL signal and S OUTLINE BUFFER FULL signal respectively, and in response to all three inputs of AND gate 456 being concurrently active, indicating the shared cache has received the appropriate input data, the STORE S IN L.B. IN S CACHE signal is provided on the output line 462 to the shared cache.

FIG. 11 sets forth further processor B cross-interrogate control logic for determining how lines are cast out and stored in the shared cache. AND gate 464 receives a B STORE XI COMPLETE signal on first input line 466 and a CH=0 signal on input line 468, and in response to both of these signals being active, the AND qate 464 provides an active signal on output line 470 thereof to the first input of an OR gate 472. OR gate 474 receives a B FETCH XI CHECKPOINT signal on a first input thereof on line 476 and a B STORE XI CHECKPOINT signal on second input line 478 thereof. When either of these input lines are active, an active signal is provided on output line 480 thereof to the first input of an AND gate 482 which receives on the second input line 484 thereof the B CH=1 signal. In response to both of these inputs being active, AND gate 482 provides an active signal on the output line 485 thereof to the second input of OR gate 472 with the output line 486 thereof being active in response to either input line being active for providing to line 488 the CAST OUT S LINE TO SCU signal to the S cache indicating that a new line is to be provided to the S cache and the least recently used line therein to be cast out. The active state of line 486 is provided to line 490 as a GATE ADDRESS FROM S DIRECTORY TO SCU signal, which is provided to the SCU to indicate the address of the line of information to be provided to the S cache. The active state of line 486 is provided to line 492 and thence to a first input of AND gate 494 which has provided to the second input line 496 thereof the S OUTLINE BUFFER FULL signal which is active when the buffer is full. AND gate 494 responds to the active signal state of both input lines to provide an active signal on output lines 498 and 500. The signal on line 500 is termed the TRF LINE TO SCU IN BUFFER signal which is applied to the SCU in buffer. The signal on line 500 is applied to the first input of an AND gate 502 which received the SCU S IN BUFFER FULL signal on the second input line 504 thereof and in response to both of these input signals being active, output line 506 becomes active to provide a STORE LINE TO MEMORY signal to the main storage unit.

Figure 12:
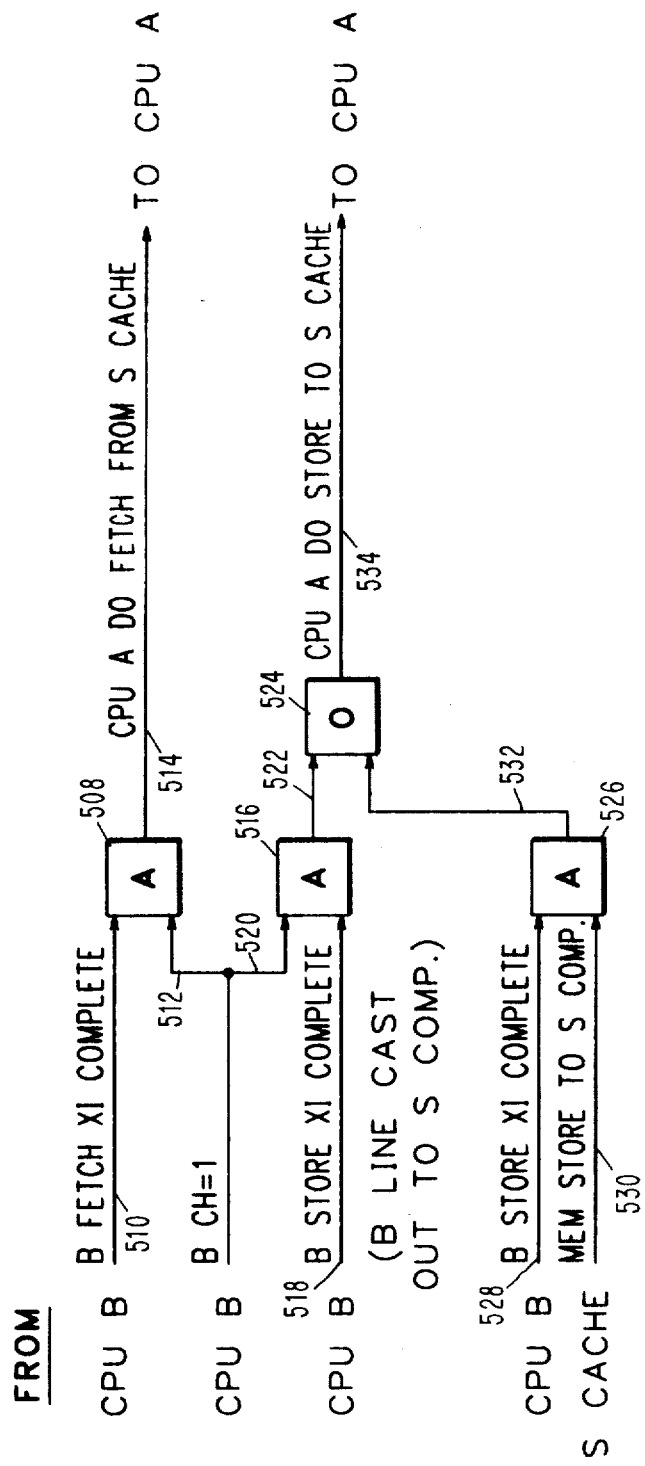

FIG. 12 sets forth the control schematic for determining when a fetch or store signal is provided to processor A in response to a cross-interrogate to processor B. AND gate 508 receives a B FETCH XI COMPLETE signal on first input line 510 thereof and a B CH=1 signal on second input line 512 thereof. The concurrence of these signals indicates that the fetch XI has been completed and that the changed line is now in the S cache. The active state of output line 514 is provided to processor A as a CPU A DO FETCH FROM S CACHE signal which indicates that data is in the S cache and is available for use by processor A and also processor B. During store operations, a B STORE XI COMPLETE signal is provided on line 518 to a first input of AND gate 516 and the B CH=1 signal is provided on first input line 520 of the AND gate 516. When both of these input lines are active indicating that the store of the changed line is complete, output line 522 thereof becomes active and is provided to the first input of an OR gate 524. AND gate 526 has provided to a first input line 528 a B STORE CROSS-INTERROGATE COMPLETE signal and provided to the second input line 530 a MEMORY STORE TO S COMPLETE signal. In response to both of these input lines being active which indicates that all store operations are complete, output line 532 becomes active with this signal being provided to the second input of OR gate 524. It is seen that the respective inputs to OR gate 524 indicate that all store operations to the shared cache have been complete, and in response to the active state of either of these input lines, output lines 534 thereof becomes active providing the CPU A DO STORE TO S CACHE signal, which indicates to processor A that it may now store data to the shared cache.

FIG. 13 is a table indicating the miss operation from the requesting processors, be they a fetch miss or store miss. This table is self-explanatory and therefore, the contents thereof will not be discussed.

FIGS. 14 and 15 set forth fetch requests and store requests logic flow charts respectively which provide a summary of the system operation in respect to the respective fetch and store request.

Refer now to FIG. 14 which sets forth the fetch request logic. In response to a CPU A fetch request as indicated at 536 at logic block 538 the question is asked, "Is there a line hit in the private cache?" If the answer is yes, the line is fetched from A's private cache to processor A as indicated at logic block 540. If the answer to this question is no, the system proceeds to logic block 542 where the question is asked, "Is there a line hit in the shared cache?" If the answer to this question is yes, the logical process proceeds to logic block 544 and the line is fetched from the shared cache to processor A. If the answer to this question is no, the logical process goes to logic block 546 where the question is asked, "Is there a cross-interrogate hit in private cache B?" If the answer to this question is no, the logical process proceeds to logic block 548 where the logical step is taken to fetch the line from main memory to processor A's cache, and the logic process proceeds to logic block 540, where the logic step fetches the line from the A cache to processor A. If the answer to the question at logic block 546 is yes, the logic process proceeds to logic block 550 where the question is asked, "Is the line changed?", that is does CH=1? If the answer to this question is no, the logic process proceeds to logic block 552 where the logic step is made to turn on the RO bits in the A and B private caches with the logic process then proceeding to logic blocks 548 and 540 to logically proceed as previously described. If the answer to the question at logic block 550 is yes, that is CH=1, the logic process proceeds to logic block 554 where the logic step is taken to move the line from the shared cache to main memory, that is, the least recently used line is cast out to main memory. Following this step, the logic process proceeds to logic block 556 where the logic step is taken to move the requested line from the private cache to the shared cache. The logic process then proceeds to logic block 558 wherein the step is taken to invalidate the line in processor B's private cache that was moved to the shared cache, and the logic process then proceeds to logic block 544 to take the logic step to fetch the requested line from the shared cache to processor A.

FIG. 15 sets forth the store request logic process. In response to a CPU A store request as indicated at 560, the logic process proceeds to logic block 562 where the question is asked "Is there a line hit in processor A's private cache?" If the answer to this question is yes, the logic process proceeds to logic block 564 where the logic step is taken to store the line in the private cache into processor A's private cache. If the answer to this question is no, the logic process proceeds to logic block 566 where the question is asked, "Is it a line hit in the shared cache?" If the answer to this question is yes, the logic process proceeds to logic block 568 where the logic step is taken to store the information from processor A into the shared cache. If the answer to the question asked at logic block 566 is no, the logic process proceeds to logic block 570 where the question is asked, "Is there an XI HIT in private cache B?" If the answer to this question is no, the logic process proceeds to logic block 572 where the decision is made to fetch the line from the main storage to requesting processor A's private cache. The logic process then proceeds to logic block 564 where the line which was just placed in A's private cache is then stored into from processor A. If the answer to the question asked at logic block 570 is yes, the logic process proceeds to logic block 574 where the step is taken to move the line from the shared cache to main storage, that is, a line is cast out in accordance with an LRU algorithm. Following the cast out of the line, the logic process proceeds to logic block 576 where the question is asked, "Is the line changed?", that is, does the change bit CH=1? If the answer to this question is yes, the logic process proceeds to logic block 578 where the logic step is taken to move the line from the B cache to the S cache. The logic process then moves to logic block 580 where the logic step is taken to invalidate this line in B processor's private cache. The logic process then proceeds to logic block 568 where the step is taken by processor A to store into the line just moved into the shared cache. If the answer to this question asked at logic block 576 is no, the logic process moves to logic block 582 and the logic step is taken to invalidate the line in B's private cache. The logic process proceeds to logic block 584 where the step is taken to fetch the line from main storage to the shared cache. Following this, the logic process proceeds to logic block 568, and the logic step is taken to store into the line just fetched to the shared cache from main storage.

Figure 16:
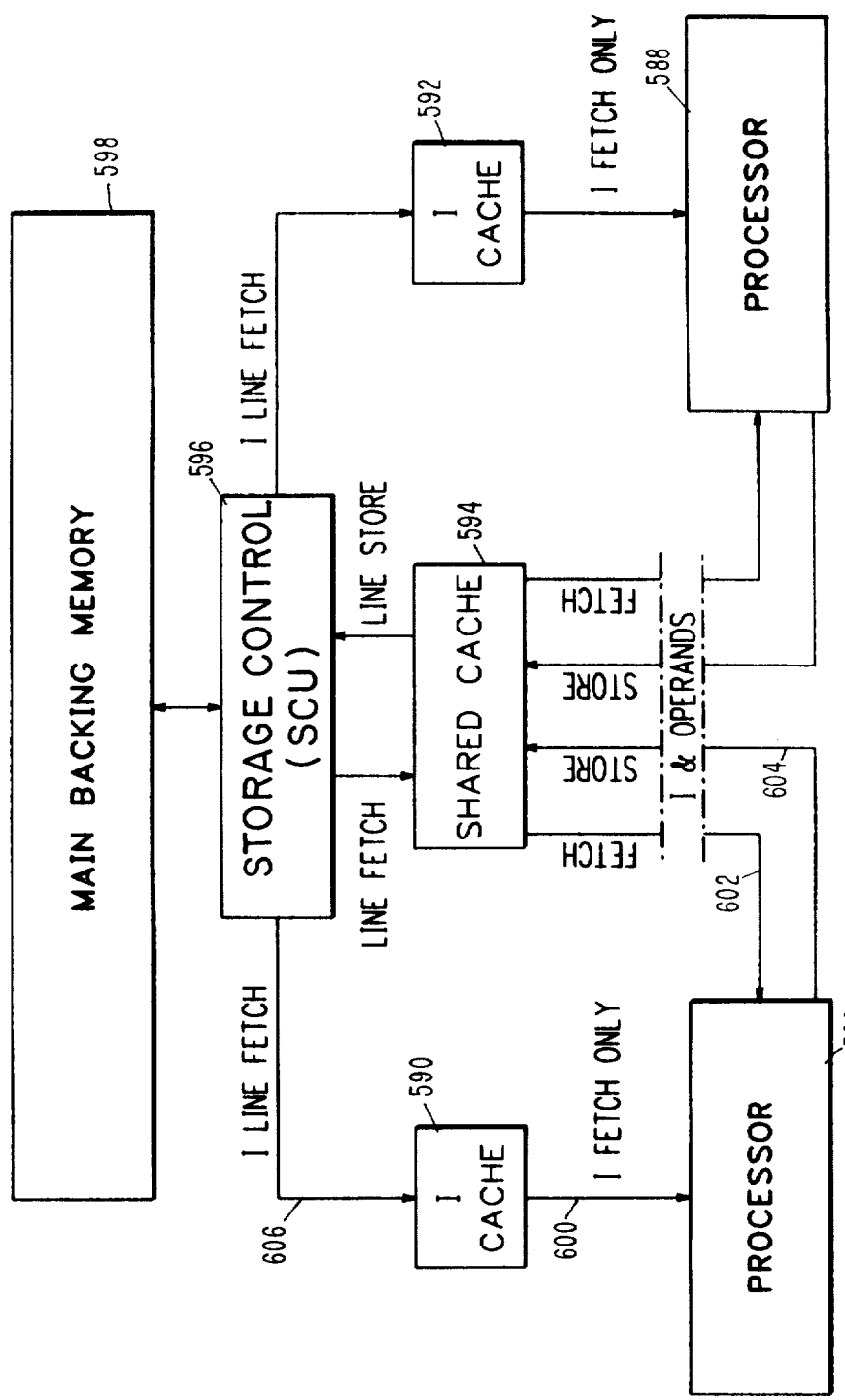
FIG. 16 is a block diagram representation of another multiprocessing system including a shared cache, according to the present invention.

FIG. 16 sets forth an alternative embodiment of a multiprocessing shared cache system. The multiprocessing system includes a plurality of processors such as processors 586 and 588. It is to be appreciated that a greater number of processors may be used in the practice of the invention, however only two such processors are illustrated for ease of explanation. Each processor has a private "read-only" instruction cache which holds instructions only. Instruction caches 590 and 592 are operative with processors 586 and 588 respectively. Each processor also has access to a "read-write" shared cache 594 which holds both operands and instructions. The shared cache utilizes a store in buffer algorithm for handling store operations. Each of the caches communicate with a storage control unit (SCU) 596 which in turn communicates with a main memory 598.

Instruction fetches will be described relative to processor 586, with it being understood that processor 588 performs instruction fetches in a like manner. On an instruction fetch, processor 586 first accesses the instruction cache 590 via line 600. If the instruction is present in the cache 590, it is fetched to processor 586. If there is a miss at the instruction cache 590, the shared cache 594 is then accessed via the line 602. If the requested line is in the shared cache 594, it is then fetched to processor 586. The only way an instruction is in the shared cache is if it is fetched as an operand originally or is stored into. The instruction fetch time from the shared cache may require one or two additional machine cycles due to logic and interference from the other processor 588. However, this should not significantly inhibit performance because most instructions are found in the initial accessing of instruction cache 590. If the requested instruction is not found in instruction cache 590 or the shared cache 594, the requested instruction is fetched from main memory 598, via the SCU 596 to instruction cache 590 and thence to processor 586.

With respect to operand fetching, all operands are fetched from the shared cache 594. If the requested operand is not in the shared cache, the line is fetched from main memory 598 via SCU 596. Essentially, if a line is in the shared cache 594, it cannot be in any other caches. Consequently, stores can be made into the shared cache via line 604 without cross-interrogating the other caches.

Since the instruction caches are read-only, no "cast out" is required. The replacement algorithm is "least recently used" (LRU) and the line being fetched can be written over the line being replaced. The bus 606 between the SCU 596 and I cache 590 can be uni-directional as well as the bus 600 between the instruction cache and the processor.

The shared cache 594 utilizes a "store in buffer" algorithm where the line is fetched into the shared cache before doing the store. A line to be replaced in the shared cache, if changed, must first be cast out to the main memory 598 before the new line being fetched is written into the shared cache.

The significant differences between this embodiment and the initial embodiment (FIG. 1) discussed are as follows. All operands, not just those that are shared and changed, are stored in the shared cache. Therefore, there is a single LRU replacement algorithm for the shared cache which reflects the combined reference activity of each processor. The private instruction caches store instructions only and therefore do not permit storing, consequently, no change (CH) or read-only (RO) flags are required in the instruction cache directory. However, the shared cache requires a change (CH) flag bit per line in its directory.

The implementations set forth in FIG. 16 include the feature that the instruction cache can be implemented in "slow write" technology since writing takes place only on line fetching from the main memory. The processor only operates in read-only mode out of the instruction cache. Also the uniqueness of the instruction cache allows for different line sizes and algorithms from the shared cache.

An operand fetch from the instruction stream causes the target line to be fetched from main memory. If the line is in the instruction cache, it will be invalidated. Subsequent instructions fetches from this line are made from the shared cache thus avoiding moving the line back to the instruction cache. In other words, those lines that contain both instructions and operands reside in the shared cache thereby avoiding the ping-ponging of lines inherent in conventional instruction and data cache organizations.

FIG. 17 sets forth the shared cache 594 and its associated directory and logic. A CPU priority logic network 606 responds to processor A store or fetch request on line 608, and processor B store or fetch request on line 610 to determine priority between the requesting processors. In the event priority is given processor A, a SELECT CPU A signal is provided on line 612, and in the event processor B is given priority, a SELECT CPU B signal is provided on line 614. The SELECT CPU A signal on line 612 is provided to a first input of an AND gate 616, and the SELECT CPU B signal on line 614 is provided to the first input of an AND gate 618. The CPU A ADDRESS BUS signal on line 620 is provided to the second input of the AND gate 616. In response to the SELECT CPU A priority signal being provided concurrent with the CPU A ADDRESS BUS signal, output line 622 becomes active and is provided with the CPU A ADDRESS BUS signal which is passed by the OR gate 624 to bus 626. The signal on bus 626 is provided to shared directory 628 and to shared cache 594 via line 630, and to replacement array A 632 via the line 634. The CPU B ADDRESS BUS signal is provided via line 636 to the second input of the AND gate 618, and in response to the concurrent provision of the SELECT CPU B signal, the AND gate 618 becomes active and provides the CPU B ADDRESS BUS signal via line 638 to OR gate 624 and thence to line 626 to the shared directory 628, to shared cache 594 and the replacement array 632.

The replacement array 632 is controlled by replacement logic 640, and in response to a line needing to be replaced in the shared directory, a signal on line 642 from replacement logic 640 is provided to share directory 628. In response to the store or fetch request line being active in the shared cache, the SELECT line 644 from shared directory 628 provides the selected address to the shared cache 594. The line requested for a fetch is then provided on the output line 646 from the shared cache 594 to first inputs of AND gates 648 and 650. If SELECT CPU A line 612 is active AND gate 648 provides a CPU A DATA BUS signal out on the line 652, and if the select CPU signal on line 614 is active, AND gate 650 provides a CPU B DATA BUS OUT signal on the line 654. In reponse to a store request, AND gate 666 has a CPU A D bus I signal provided to an input line 668, and AND gate 670 has a CPU B D bus I signal provided on line 671. In response to a SELECT CPU A signal on line 612 the AND gate 666 becomes active to pass the signal on line 668 to the first input of the OR gate 674 and thence to shared cache 594 for storage via line 676. If the SELECT CPU B signal on line 614 is active at the second input of AND gate 670, a data signal on line 671 is passed via OR gate 674 and line 676 for storage in the shared cache 594.

In summary, a multiprocessing system has been disclosed in which each processor in the system has a private cache, and each processor in the system has access to a shared cache and a shared main memory device, thus eliminating the ping-ponging of lines that occur in multiprocessing systems which do not utilize a shared cache.

Having thus described my invention, what I claim as new, and desire to secure by Letters Patent is:

1. In a multiprocessor system, the combination comprising:
  at least first and second processors;
  a main storage means for storing a plurality of pieces of information at main storage addressable locations;
  at least first and second private cache storage means operative with said at least first and second processors, respectively, in which a given number of pieces of information previously transferred from said main storage means are stored, including means for directly accessing said private cache storage means;

a shared cache storage means, including means for directly accessing said shared cache storage means by each of said at least first and second processors, in which a number of pieces of information, previously transferred from at least one of said at least first and second private cache storage means, are stored;

means for interrogating said private cache of said first processor to determine if information stored at a given main memory addressable location is stored therein, and if so, including means for accessing said information for use by said first processor; and if not means for interrogating said shared cache to determine if said information is stored therein, and if so, including means for accessing said information for use by said first processor; and if not means for interrogating said private cache of said second processor to determine if said information is stored therein, and if so, including means for determining if the information has been changed with respect to the main storage copy of the information, and if the information has been changed, including means for transferring said information to said shared cache for immediate access by said first and second processors, and if the information has not been changed, including means for fetching said information to said first processor's private cache from said main storage means; and if said information is not stored in said private cache of said second processor, means for fetching said information to said private cache of said first processor from said main storage means.

2. A data processing system comprising:

a main storage means for storing a plurality of pieces of information at addressable locations; including a directory means for identifying where each of said plurality of pieces of information are stored;

a plurality of processing means;

each of said processing means including a private high speed storage means associated therewith for storing a predetermined number of said pieces of information previously transferred from said main storage means to said private high speed storage means, including means for directly accessing said private high speed storage means by its associated processor;

each of said private high speed storage means including a directory means for identifying pieces of information in said private storage means for immediate access by its associated processing means;

a shared high speed storage means, including means for directly accessing said shared high speed storage means by each of said plurality of processing means, for storing a number of pieces of information previously transferred from said main storage means to at least one of said private high speed storage means, and subsequently transferred to said shared high speed storage means from said one private high speed storage means, following said number of pieces of information being changed with respect to the main storage copy of the information, by the processor associated with said one high speed private storage means, and then subsequently being requested by another processing means;

a directory means operable with said shared high speed storage means for identifying pieces of information in said shared high speed storage means for immediate access by each of said plurality of processing means;

storage control means, including copies of each of the directory means of each of the private high speed storage means, interconnected between said main storage means and each of the private and shared high speed storage means and their directory means for controlling the transfer of said pieces of information between the respective storage means; and each of said processing means including means for providing a local address signal identifying a piece of information in said main storage means, with said local address signal being provided by a given processing means in a predetermined sequence to:
  (a) said directory means of said private high speed storage means of said given processing means,
  (b) said directory means of said shared high speed storage means,
  (c) said copy in said storage control means of the directory means of the private high speed storage means of the other processing means, and
  (d) said directory means of said main storage means, with said given processing means including means for determining the first directory means in the predetermined sequence that indicates the storage means associated therewith has the identified piece of information stored therein, and means for accessing said identified piece of information by said given processing means.

3. A data processing system comprising:

a main storage means for storing a plurality of pieces of information at addressable locations, including a directory means for identifying where each of said plurality of pieces of information are stored;

at least first and second processing means;

said first and second processing means each including a private high speed storage means associated therewith for storing a predetermined number of said pieces of information previously transferred from said main storage means to said private high speed storage means, including means for directly accessing said private high speed storage means by its associated processor;

each of said private high speed storage means including a directory means for identifying said pieces of information in said private storage means for immediate access by its associated processing means;

a shared high speed storage means which is operative with and directly accessible by each of said at least first and second processors, and in which is stored at addressable locations pieces of information which have been changed, with respect to the main storage copy of the information, by one processor and are subsequently requested by the other processor, and following the request are transferred from said one processor's private high speed storage means to said shared high speed storage means, including means for directly accessing said shared high speed storage means by each processor;

a directory means operable with said shared high speed storage means for identifying pieces of information in said shared high speed storage means for immediate access by each of said first and second processing means;

storage control means, including copies of each of the directory means of each of the private high speed storage means, interconnected between said main storage means and each of the private and shared high speed storage means and their directory means for controlling the transfer of said pieces of information between the respective storage means; and each of said processing means including means for providing a local address signal identifying a piece of information in said main storage means, with said local address signal being provided by one of said first and second processing means in a predetermined sequence to:
(a) said directory means of said private high speed storage means of one of said first and second processing means;
(b) said directory means of said shared high speed storage means;
(c) said copy in said storage control means of the directory means of the private high speed storage means of the other one of said first and second processing means;
(d) said directory means of said main storage means; and means operative with said means for providing a local address signal, to determine the first directory means in the sequence that indicates the storage means associated therewith which has the identified piece of information stored therein.

4. A data processing system comprising:
a main storage means for storing a plurality of instructions and operands at addressable locations;
at least first and second processing means;
said first and second processing means each including a private high speed storage means associated therewith for storing a predetermined number of instructions only, previously transferred from said main storage means to said private high speed storage means, including means for directly accessing said private high speed storage means by its associated processor;
a shared directly accessible high speed storage means, associated with each of said first and second processing means, for storing a predetermined number of instructions and operands previously transferred from said main storage to said shared high speed storage means, including means for directly accessing said shared high speed storage means by each processor.

each of said processing means including means for providing a local address signal identifying an instruction or operand in said main storage means, with said local address signal being provided by one of said first and second processing means in a predetermined sequence to:
(a) said private high speed storage means of one of said first and second processing means directly if the local address signal identifies an instruction,
(b) said shared high speed storage means directly if the local address signal identifies an instruction or operand,
(c) said main storage if the local address signal identifies an instruction or operand, and including means operative with said means for providing a local address signal to determine the first storage means in the sequence that indicates the identified instruction or operand is stored therein, with the identified instruction or operand being fetched from said first storage means in the sequence to the processing means which provided said local address signal.

5. A data processing system comprising:
a main storage means for storing a plurality of instructions and operands at addressable locations; including a directory means for identifying where each of said plurality of instructions and operands are stored;
a plurality of processing means;
each of said processing means including a directly accessible private high speed storage means for storing a predetermined number of instructions previously transferred from said main storage means to said private high speed storage means, including means for directly accessing said private high speed storage means by its associated processor;
each of said private high speed storage means including a directory means for identifying instructions in said private storage means for immediate access by its associated processing means;
a shared high speed storage means, including means for directly accessing said shared high speed storage means by each of said plurality of processing means, for storing therein a number of instructions and operands previously stored in at least one of said private high speed storage means, with said instructions and operands being changed with respect to the main storage means copy thereof by said one private high speed storage means and then subsequently being requested by another processor, and following the request being transferred to said shared high speed storage means;
a directory means operable with said shared high speed storage means for identifying instructions and operands in said shared high speed storage means for immediate access by each of said plurality of processing means;
each of said processing means including means for providing a local address signal identifying an instruction or operand in said main storage means, with said local address signal being provided by a given processing means in a predetermined sequence to:
(a) said directory means of said private high speed storage means of said given processing means in the local address signal identifies an instruction,
(b) said directory means of said shared high speed storage means if the local address signal identifies an instruction or operand, and
(c) said directory means of said main storage means, if the local address signal identifies an instruction or operand; and
means operative with said means for providing a local address signal to determine the first directory means in the sequence that indicates the storage means associated therewith has the identified instruction or operand stored therein, with the identified instruction or operand being accessed in said associated storage means by said given processing means.

6. A method of operating a multiprocessor system comprised of at least first and second processors, a private cache storage device associated with each processor, which is directly accessible by its associated processor, a shared cache storage device which is shared by each processor, which is directly accessible by each processor, and a main memory storage device which is shared by each processor, with information being referenced with respect to addressable locations in said main memory storage device, said method comprising the steps of:

storing slected pieces of information from said main memory storage device in each of said private cache storage devices;

transferring pieces of information, that have been or are about to be updated with respect to the main memory storage copy of the information in the private cache storage device of one of said first and second processors, and is subsequently requested by the other one of said first and second processors, to said shared cache storage device for storage therein, and accessing a selected piece of information by a given processor in response to interrogating each of said private cache directly, said shared cache directly and said main memory storage device in a predetermined sequence.

7. A method of operating a multiprocessor system comprised of at least first and second processors, a private cache storage device associated with each processor, which is directly accessible by its associated processor, a shared cache storage device which is shared by each processor, which is directly accessible by each processor and a main memory storage device which is shared by each processor, with information being stored at addressable locations in said main memory storage device, with selected pieces of information being stored in said private cache storage devices device for immediate access by each processor following said information being updated, with respect to the main memory copy of the information, by one processor and subsequently being requested by another processor, said method comprising the steps of:

interrogating in a predetermined sequence by said first processor:

(a) said private cache storge device of said first processor directly, (b) said shared cache storage device directly, (c) said private cache storage device of said second processor directly, and (d) said main memory storage device, to determine if a given piece of information is stored therein; and accessing said given piece of information from a given storage device by said first processor in response to said given storage device in the sequence indicating that said piece of information is stored therein.

8. A method of operating a multiprocessor system comprised of at least first and second processors, a private cache associated with each processor, which is directly accessible by its associated processor, a shared cache which is shared by each processor, which is directly accessible by each processor, and a main memory, with information stored in the system being referenced with respect to addressable locations in said main memory, with selected pieces of information being stored in said private caches and said shared cache for immediate access by each processor, said method comprising the steps of:

interrogating said private cache of said first processor directly to determine if information stored at a given main memory addressable location is stored therein, and if so directly accessing said information for use by said first processor; and if not interrogating said shared cache directly to determine if said information is stored therein, and if so directly accessing said information for use by said first processor; and if not interrogating said private cache of said second processor directly to determine if said information is stored therein, and if so determining if the information has been changed with respect to the main memory copy of the information, and if the information has been changed, transferring said information to said shared cache for immediate access by said first and second processors, and if the information has not been changed fetching said information to said first processors cache from main memory; and if said information is not stored in said private cache of said second processor;

fetching said information to said private cache of said first processor from said main memory.

9. The method of claim 8, following the direct interrogation of said second processors private cache and finding that said information is stored therein and has not been changed, with said information being fetched from said main memory to said private cache of said processor, including the step of:

marking said information read only in said private cache of said first and second processors.

10. A method of operating a multiprocessor system comprised of at least first and second processors, at least first and second private cache storage devices associated with said first and second processors, respectively, which store instructions only and is directly accessible by its associated processor, a shared cache storage device which is shared by each processor, which stores instructions and operands and which is directly accessible by each processor, and a main memory storage device which is shared by each processor, which stores instructions and operands, with information being stored with respect to addressable locations in said main memory storage device, with selected instructions being stored in said private cache storage devices, and selected instructions and operands being stored in said shared cahce storage device for immediate access by each processor, with each processor including means for providing a local address signal identifying an instruction or operand in said main memory storage device which is a given processor desires to access, said method comprising the steps of:

interrogating by a given processor by providing said local address signal in a predetermined sequence to:

(a) said private cache storage device of said given processor directly if said local address signal identifies an instruction, (b) said shared cache storage device directly if said local address signal identifies an instruction or operand, (c) said main memory storage device if said local address signal identifies an instruction or operand, and accessing said instruction or operand from a given storage device by said given processor in response to said given storage device in the sequence indicating that said instruction or operand is stored therein.

11. A method of operating a multiprocessor system comprised of at least first and second processors, a private cache storage device associated with each processor, which is directly accessible by its associated processor, a shared cache storage device which is shared by each processor and is directly accessible by each processor and a main memory storge device which is shared by each processor, with instructions and operands being referenced with respect to addressable locations in said main memory storage device, said method comprising the steps of:

storing selected instructions only in each of said private cache storage devices;
 storing instructions and operands in said shared cache storage device; and
 accessing a selected instruction or operand by a given processor in response to selectively interrogating said private cache directly, said shared cache directly and said main memory storage device in a sequence predetermined by whether an instruction or operand is to be accessed.

12. In a multiprocessor system, the combination comprising:

a main storage means for storing a plurality of pieces of information at addressable locations;
 at least first and second processors;
 at least first and second private high speed storage means which are operative with and directly accessible by said at least first and second processors, respectively, and in which a number of pieces of information transferred from said main storge means are stored at addressable locations, including means for directly accessing said private high speed storage means by its associated processor; and
 a shared high speed storage means which is operative with and directly accessible by each of said at least first and second processors, and in which is stored at addressable locations pieces of information which have been changed, with respect to the main storage means copy of the information; by one processor and are subsequently requested by the other processor, and following the request are transferred from said one processor's private high speed storage means to said shared high speed storage means, including means for directly accessing said shared high speed storage means by each processor.

13. In a multiprocessor system, the combination comprising:

a main memory for storing a plurality of pieces of information at addressable locations;
 at least first and second processors;
 at least first and second private cache memories which are operative with and directly accessible by said at least first and second processors, respectively, and in which a number of pieces of information transferred from said main memory are stored at addressable locations, including means for directly accessing said first and second private cache memories by their associated processor; and
 a shared cache memory which is operative with and directly accessible by each of said at least first and second processors, and in which is stored at addressable locations pieces of information which have been stored in the first private cache memory and have been updated with respect to the main memory copy of the information, and are subsequently requested by the second processor, or are stored in the second private cache memory and have been updated with respect to the main memory copy of the information and are subsequently requested by the first processor, and following said request are transferred from one of said first and second private cache memories to said shared cache memory, including means for directly accessing said shared cache memory by each of said at least first and second processors.

14. In a multiprocessor system, the combination comprising:

a main storage means for storing a plurality of pieces of information at addressable locations;
 at least first and second processors;
 at least first and second private high speed storage means which are operative with and directly accessible by said at least first and second processors, respectively, and in which a number of instructions only, previously transferred from said main storage means, are stored at addressable locations, including means for directly accessing said at least first and second private high speed storage means by their associated processor; and
 a shared high speed storage means which is operative with and directly accessible by each of said at least first and second processors, and in which is stored, at addressable locations, a number of instructions and operands previously transferred from said main storage means to said shared high speed storge means, including means for directly accessing said shared high speed storage means by each of said at least first and second processors.

15. A method of operating a multiprocessor system comprised of, at least first and second processors, a directly accessible private cache memory associated with each processor, a shared cache memory which is shared and directly accessible by each processor, and a main memory which is shared by each processor, with information being referenced with respect to addressable locations in said main memory, said method comprising the steps of:

storing selected pieces of information, transferred from said main memory, in each of said private cache memories; and
 transferring pieces of information that have been or are about to be changed, with respect to the main memory copy of the information, in the private cache memory of one of said first and second processors, and is subsequently requested by the other one of said first and second processors, to said shared cache memory for storage therein, and subsequent direct access by each of said first and second processors; and
 means for directly accessing said shared cache memory and said private cache memories by said processors.

* * * * *